US012411454B2

(12) United States Patent
Hamasaki

(10) Patent No.: US 12,411,454 B2
(45) Date of Patent: Sep. 9, 2025

(54) IMAGE FORMING APPARATUS

(71) Applicant: CANON KABUSHIKI KAISHA, Tokyo (JP)

(72) Inventor: Ryuji Hamasaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/679,269

(22) Filed: May 30, 2024

(65) Prior Publication Data

US 2024/0427285 A1 Dec. 26, 2024

(30) Foreign Application Priority Data

Jun. 23, 2023 (JP) ................................ 2023-103510

(51) Int. Cl.

| | |
|---|---|
| ***G03G 21/20*** | (2006.01) |
| ***G03G 15/00*** | (2006.01) |
| ***G03G 15/01*** | (2006.01) |
| ***G03G 15/20*** | (2006.01) |
| ***G03G 21/16*** | (2006.01) |
| ***G03G 21/18*** | (2006.01) |

(52) U.S. Cl.

CPC ....... *G03G 21/206* (2013.01); *G03G 15/0189* (2013.01); *G03G 15/2017* (2013.01); *G03G 15/80* (2013.01); *G03G 21/1619* (2013.01); *G03G 21/1633* (2013.01); *G03G 21/1857* (2013.01)

(58) Field of Classification Search

CPC ..... G03G 21/20; G03G 21/203; G03G 21/206
See application file for complete search history.

(56) References Cited

U.S. PATENT DOCUMENTS

| | | | | |
|---|---|---|---|---|
| 9,170,561 | B2 * | 10/2015 | Miyagawa | G03G 21/206 |
| 11,092,928 | B2 * | 8/2021 | Okawa | G03G 21/1619 |
| 2014/0140719 | A1 * | 5/2014 | Suzuki | G03G 15/0189 399/92 |
| 2014/0147160 | A1 * | 5/2014 | Konishi | G03G 21/206 399/92 |
| 2015/0241842 | A1 | 8/2015 | Suzuki | G03G 21/20 |
| 2018/0246445 | A1 * | 8/2018 | Yamashita | G03G 15/2064 |
| 2018/0284651 | A1 * | 10/2018 | Sunayama | G03G 15/0893 |
| 2021/0333754 | A1 | 10/2021 | Okawa et al. | G03G 21/20 |
| 2022/0128948 | A1 | 4/2022 | Shuhama | G03G 21/20 |
| 2023/0288839 | A1 * | 9/2023 | Kawasumi | G03G 15/04063 |

FOREIGN PATENT DOCUMENTS

| | | |
|---|---|---|
| JP | 2014-123110 | 7/2014 |
| JP | 2021-056441 | 4/2021 |
| JP | 2022-071545 | 5/2022 |

* cited by examiner

*Primary Examiner* — Carla J Therrien
(74) *Attorney, Agent, or Firm* — Venable LLP

(57) ABSTRACT

An image forming apparatus includes a plurality of cartridges, a fixing device, a fan and a duct. The duct guides air supplied from the fan to a predetermined cartridge closest to the fixing device of the plurality of cartridges. At one end side of the predetermined cartridge in the rotational axis direction, the duct includes a first part for discharging the air supplied from the fan in a first direction toward downward from upward to a top surface of the cartridge, and a second part for discharging the air supplied from the fan, above the top surface in a second direction along a rotational axis direction of a photosensitive member. The air discharged from the first part and the air discharged from the second part collide with each other above the top surface.

12 Claims, 18 Drawing Sheets

(a)

(b)

(a)

(b)

(a)

(b)

(a)

(b)

(a)

(b)

(c)

IMAGE FORMING APPARATUS

FIELD OF THE INVENTION AND RELATED ART

The present invention relates to an image forming apparatus for forming an image on a recording material.

Generally, an image forming apparatus such as a laser printer includes a heating portion such as a fixing device inside the apparatus to fuse powder toner to a recording material such as paper using heat. Further, the image forming apparatus also includes a cartridge which accommodates toner. When the cartridge is heated by heat generated by the heating portion and the temperature rises, there is a risk that the toner inside the cartridge will deteriorate or change in quality. For this reason, the temperature of the cartridge must be prevented from rising too high by blowing air on the cartridge and the like. As a configuration for ensuring good cooling, for example, in a color image forming apparatus using four color cartridges, an apparatus has been disclosed in which independent air passages are provided for each cartridge, and the cartridges are cooled by blowing air through the air passages (for example, refer to Japanese Laid-Open Patent Application (JP-A) 2021-056441).

In recent years, there has been an increasing need to reduce the overall size of image forming apparatuses to improve usability and reduce costs. However, in a conventional configuration in which an air passage is provided for each of the four color cartridges, a duct is required to form each air passage. If a cross-sectional area of the duct's flow path is small, air flow becomes poor, so it is difficult to make the duct size extremely small to obtain a cooling effect. For this reason, when four ducts are provided, in addition to requiring space inside the image forming apparatus, the cost of the ducts is also required.

The present invention has been made under such circumstances, with the purpose to reduce costs by efficiently disposing air passages to cool a plurality of cartridges while achieving a reduction in the size of the image forming apparatus.

SUMMARY OF THE INVENTION

In order to solve the aforementioned problem, the present invention has the following configuration.

(1) According to an aspect of the present invention, there is provided an image forming apparatus for forming an image on a recording material, the image forming apparatus comprising: a plurality of cartridges each including a developing member for developing an electrostatic latent image formed on a photosensitive member with toner; a fixing device configured to fix an unfixed toner carried on the recording material; a fan configured to supply air; and a duct configured to guide the air supplied from the fan to a predetermined cartridge closest to the fixing device of the plurality of cartridges, wherein the predetermined cartridge includes a top surface positioned above in a vertical direction, of two surfaces which the cartridge includes and which cross in the vertical direction, wherein, at one end side of the predetermined cartridge in the rotational axis direction, the duct includes a first part for discharging the air supplied from the fan in a first direction toward downward from upward in the vertical direction to the top surface, and a second part for discharging the air supplied from the fan, above the top surface in the vertical direction, in a second direction along a rotational axis direction of the photosensitive member, and wherein the air discharged from the first part and the air discharged from the second part collide with each other above the top surface.

(2) According to an aspect of the present invention, there is provided an image forming apparatus for forming an image on a recording material, the image forming apparatus comprising: a plurality of cartridges each including a developing member for developing an electrostatic latent image formed on a photosensitive member with toner; a fixing device configured to fix an unfixed toner carried on the recording material; a fan configured to supply air; and a duct configured to guide the air supplied from the fan to a predetermined cartridge closest to the fixing device of the plurality of cartridges, wherein the predetermined cartridge includes the top surface positioned above in a vertical direction, of two surfaces which the predetermined cartridge includes and which cross in the vertical direction, wherein, at one end side of the predetermined cartridge in the rotational axis direction, the duct includes a first opening through which the air supplied from the fan is discharged in a first direction toward downward from upward in the vertical direction to the top surface, and a second opening through which the air supplied from the fan, above the top surface in the vertical direction, is blown out in a second direction along a rotational axis direction of the photosensitive member, and wherein an imaginary first region formed by extending the first opening in the first direction and an imaginary second region formed by extending the second opening in the second direction cross with each other above the top surface.

Further features of the present invention will become apparent from the following description of exemplary embodiments with reference to the attached drawings.

DESCRIPTION OF THE EMBODIMENTS

In the following, embodiments for carrying out the present invention will be described in detail with reference to Figures. However, the dimensions, materials, shapes and relative arrangements of components described in these embodiments should be changed as appropriate according to the configuration and various conditions of the apparatus to which the present invention is applied. In other words, the scope of the present invention is not intended to be limited to the following embodiments.

Embodiment 1

[Outside of the Image Forming Apparatus]

Figure 1:
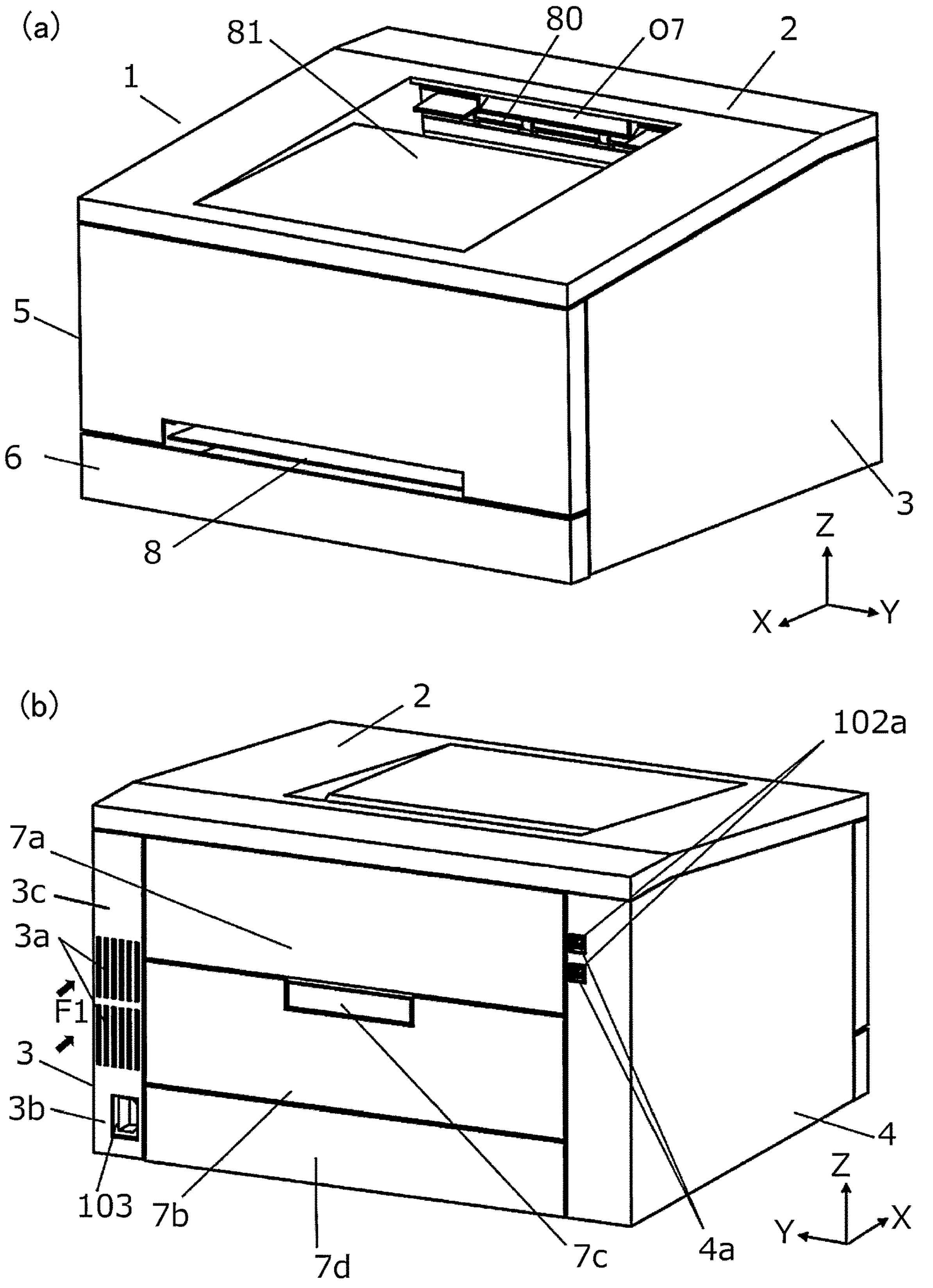
FIG. 1, part (a) and part (b), is a perspective view of an image forming apparatus according to a first embodiment.

An image forming apparatus will be explained with reference to FIG. 1. FIG. 1 is a perspective view of a color laser beam printer, which is an example of an image forming apparatus 1 according to a first embodiment, as viewed respectively from front and back surface sides. Incidentally, in coordinate axes shown in FIG. 1, X refers to a front-rear direction of the product, Y refers to a width direction (crosswise direction) of the product, and Z refers to a height direction (vertical direction) of the product. Incidentally, in the front-rear direction, the front is also the front side and the rear is also the back surface; the crosswise direction is defined as left and right when viewed from the front side.

An outer surface of the image forming apparatus 1 is composed of a plurality of covers made mainly of a non-conductive resin. Incidentally, the term "non-conductive" here does not mean insulation; it means that it does not have good conductivity like metal. Covers, which are exterior portions of the image forming apparatus 1, are comprised of an upper cover 2, a right cover 3, a left cover 4, a front door 5, a cassette cover 6, a rear upper cover 7*a* on the back surface side, a rear door 7*b*, a rear door handle 7*c* and a rear lower cover 7*d*.

The front door 5 is provided to be openable and closable with respect to a main assembly of the image forming apparatus 1 (hereinafter referred to as the main assembly) for the purpose of replacing cartridges 21 described below. The cassette cover 6 is fixed so as to be integrated with a cassette 9 (see part (a) of FIG. 3) described below, and it is provided to be insertable and removable from the main assembly together with the cassette 9. The rear door 7*b* is provided to be openable and closable with respect to the main assembly for jam processing and internal unit replacement. jacking a recording material S (see part (a) of FIG. 4) described below such as printed paper. The right cover 3 (cover) is fixed to the main assembly and includes a suction opening 3*a* and an opening 3*b*. The suction opening 3*a* is provided on the back surface side of the right cover 3. The opening 3*b* is an opening through which a socket 103, a connecting portion to which a cable connected to an external power source such as an outlet for power supply is connected, is exposed.

The left cover 4 is provided with an opening 4*a* through which a communication port 102*a*, which allows various communication cables to be inserted and removed from the outside, is exposed. Incidentally, the configuration of the covers in the first embodiment, such as whether or not they are fixed, whether or not they can be opened or closed, and whether or not they are subdivided, are examples, and the present invention is not necessarily limited to this configuration. Further, the covers may be provided integrally, may be further subdivided, may be openable/closable, or may be fixedly supported, and each opening portion may be configured with a cover different from that in the first embodiment.

[Outside of the Image Forming Apparatus]

Figure 2:
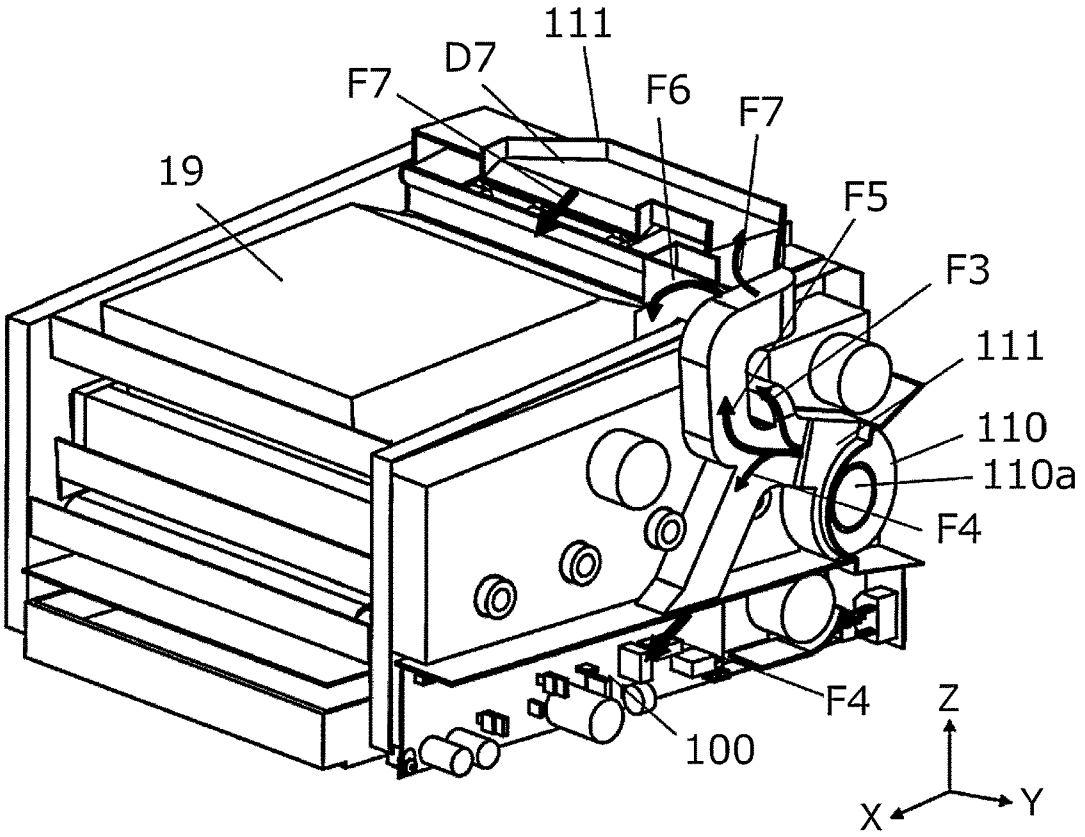
FIG. 2, part (a) and part (b), is a perspective view showing an internal configuration of the image forming apparatus according to the first embodiment.
Figure 2:
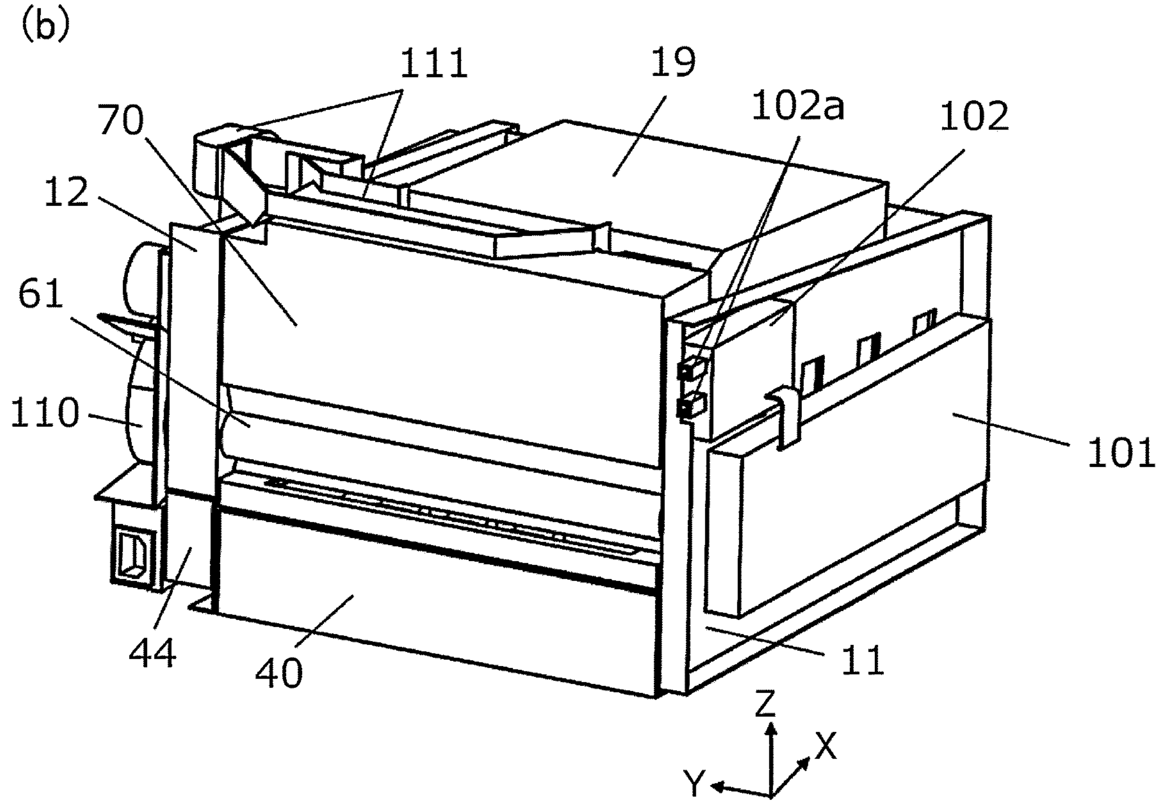
Figure 3:
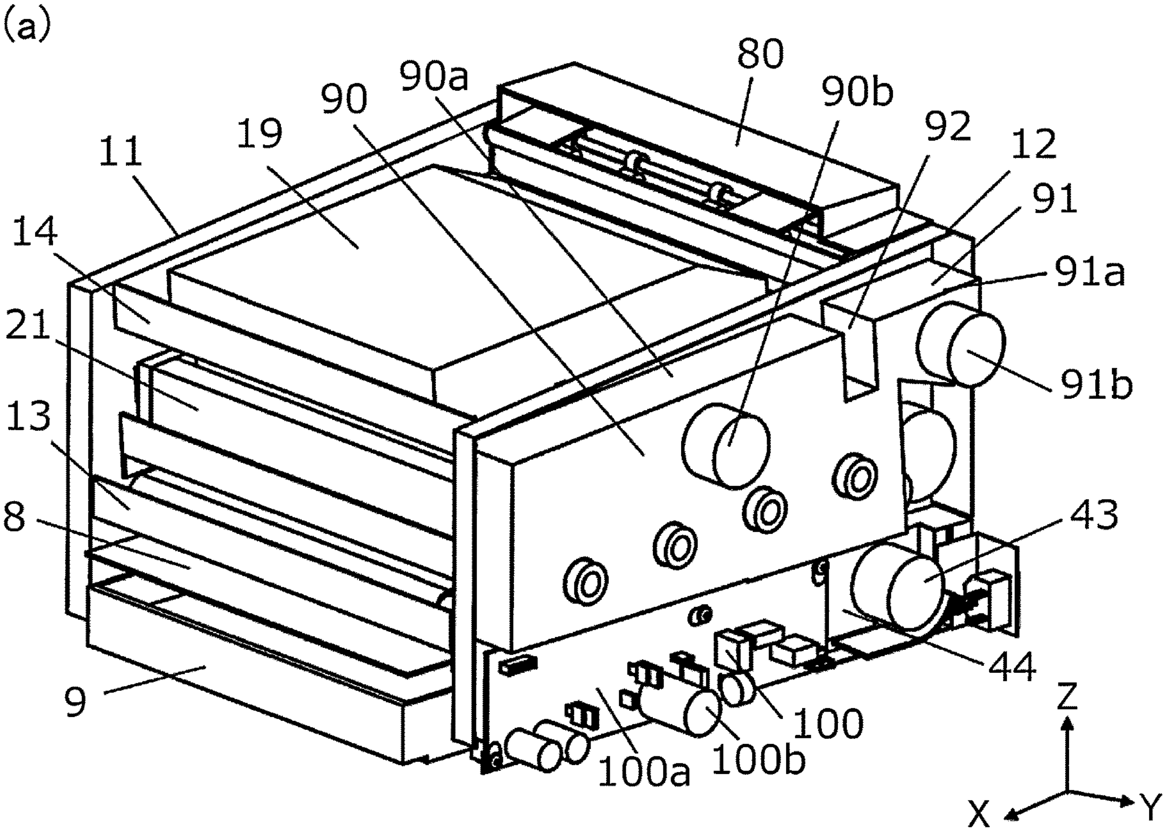
FIG. 3, part (a) and part (b), is a perspective view and a perspective view of a frame showing the internal configuration of the image forming apparatus according to the first embodiment.
Figure 3:
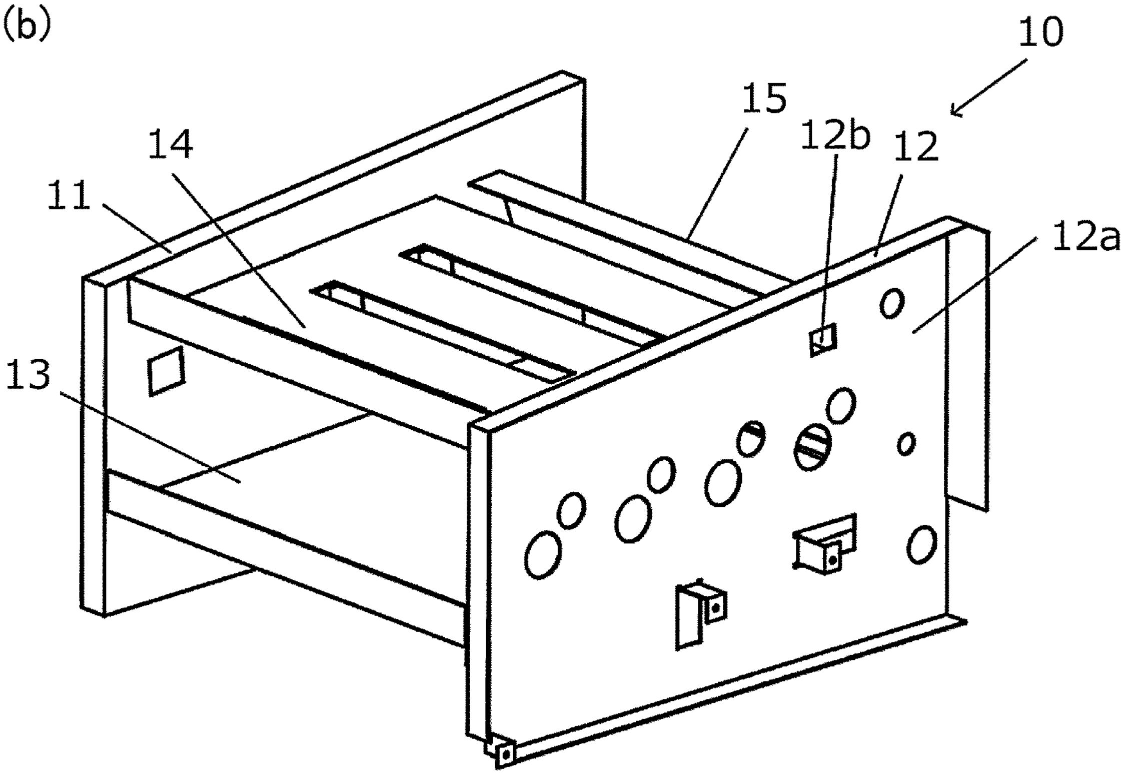

FIG. 2 is a perspective view of the inside of the image forming apparatus 1 as viewed from the front side and the back surface side with the covers described in FIG. 1 (not shown). Part (a) of FIG. 3 is a perspective view of the inside of the image forming apparatus 1 viewed from the front side, with the covers, duct and fan of the image forming apparatus 1 not shown. Part (b) of FIG. 3 is a perspective view viewed from the front side of the configuration of a frame 10 which forms a skeleton of the image forming apparatus 1.

The image forming apparatus 1 is an apparatus for forming an image on the recording material S, and is provided with the frame 10.The frame 10 is formed from conductive metal plates and is mainly comprised of a left frame 11, a right frame 12, a main frame 13, a scanner frame 14 and a fixing frame 15. The right frame 12, which is a first frame, crosses a rotational axis direction of photosensitive drums 24 (see part (b) of FIG. 4) and partitions the image forming apparatus 1 into an inside and an outside. The left frame 11, which is a second frame, crosses the rotational axis direction, partitions the image forming apparatus 1 into the inside and the outside, and faces the right frame 12.

In the first embodiment, a space formed between the left frame 11 and the right frame 12 is called an inner side of the frame, and the respective spaces outside the right frame 12 and the left frame 11 are called an outer side of the frame. The main frame 13, the scanner frame 14 and the fixing frame 15 are disposed between the left frame 11 and the right frame 12, and they are coupled to the left frame 11 and the right frame 12 so as to form a part of the skeleton.

The right frame 12 includes a main plane 12*a* and an opening 12*b* (opening, third opening). The opening 12*b* guides a duct 111 (see FIG. 6) described below from the outer side of the frame to the inner side of the frame. By providing the opening 12*b*, the duct 111 (a duct 111C described below) can be made linear, and outside air can be efficiently guided to the inside of the image forming apparatus 1. Incidentally, a part of the opening 12*b* does not have to be an opening as shown in part (b) of FIG. 3. For example, the opening 12*b* may be a cutout shape (cutout, first cutout) which extends to the upper side of the right frame 12.

Further, the shape of the opening 12*b* does not have to be rectangular as shown in part (b) of FIG. 3, and may be another shape such as circular, elliptical or polygonal, as long as it allows the duct 111 to pass.

The disposition and support of each portion of the image forming apparatus 1 will be described with reference to FIGS. 2 and 3. A laser scanner 19 is positioned on a top portion of the scanner frame 14 and is supported by the scanner frame 14. A transfer drive portion 90 is mainly positioned on the outer side of the right frame 12, includes a transfer drive frame 90*a*, and is supported by the right frame 12. A fixing drive portion 91 is mainly positioned on the outer side of the right frame 12, includes a fixing drive frame 91*a*, and is supported by the right frame 12. The transfer drive portion 90 and the fixing drive portion 91 may be configured integrally or configured as separate portions. A portion of the transfer drive portion 90 exists by passing through a hole formed in the right frame 12 so as to transmit power to a unit inside the frame. A cutout portion 92 (second cutout) provided between the transfer drive frame 90*a* and the fixing drive frame 91*a* guides the duct 111 described below from the outer side of the frame to the inner side of the frame. By providing the cutout portion 92, the duct 111 (the duct 111C described below) can be made linear, and the outside air can be efficiently guided to the inside of the image forming apparatus 1. Incidentally, the cutout portion 92 does not have to have a cutout shape as shown in part (a) of FIG. 3, and may be, for example, an opening (fourth opening) large enough for the duct 111 to pass through.

A power source portion 100 converts an AC voltage of an AC power source supplied via the socket 103 into a low DC voltage such as 3.3V or 24V to generate a voltage. The power source portion 100 is positioned on the outer side (outside) of the right frame 12 and below the transfer drive portion 90, and it is supported by the right frame 12 and peripheral components. The cassette 9 is positioned on the inner side of the frame and below the main frame 13. A manual feed portion 8 is divided into upper and lower units with a path P2 shown in part (a) of FIG. 4 interposed therebetween. A supply/separation portion 40 is located mainly on the inner side of the frames, and it is supported by the main frame 13, the right frame 12 and the left frame 11. A supply drive mechanism 44 is positioned on the bottom back side of the right frame 12, and it straddles the right frame 12 to connect the units on the inside and outside of the frame.

An intermediary transfer belt 31 and primary transfer rollers 34 are positioned between the left frame 11 and the right frame 12, between the main frame 13 and the scanner frame 14, and below the cartridges 21 (see part (a) of FIG. 4). The intermediary transfer belt 31 and the primary transfer rollers 34 are supported by the right frame 12, the left frame 11 and peripheral members (not shown). A secondary transfer roller 61 (see part (a) of FIG. 4) is supported by the right frame 12 and the left frame 11 so as to be swingable. When the rear door 7*b* is opened, the secondary transfer roller 61 is movable to an open position in synchronization with the rear door 7*b*, and when moved to the open position, the rear door 7*b* opens a conveyance passage of the recording material S to the outside. A fixing device 70 and a discharge portion 80 are formed as an integrated unit, and they are supported on the upper rear sides of the right frame 12 and the left frame 11. The discharge portion 80 discharges the recording material S onto which toner is fixed by the fixing device 70.A controlling portion 102 and a high voltage portion 101 are positioned on the opposite side to the power source portion 100, that is, on the outer side of the left frame 11, and are supported by the left frame 11 and its peripheral members.

Figure 4:
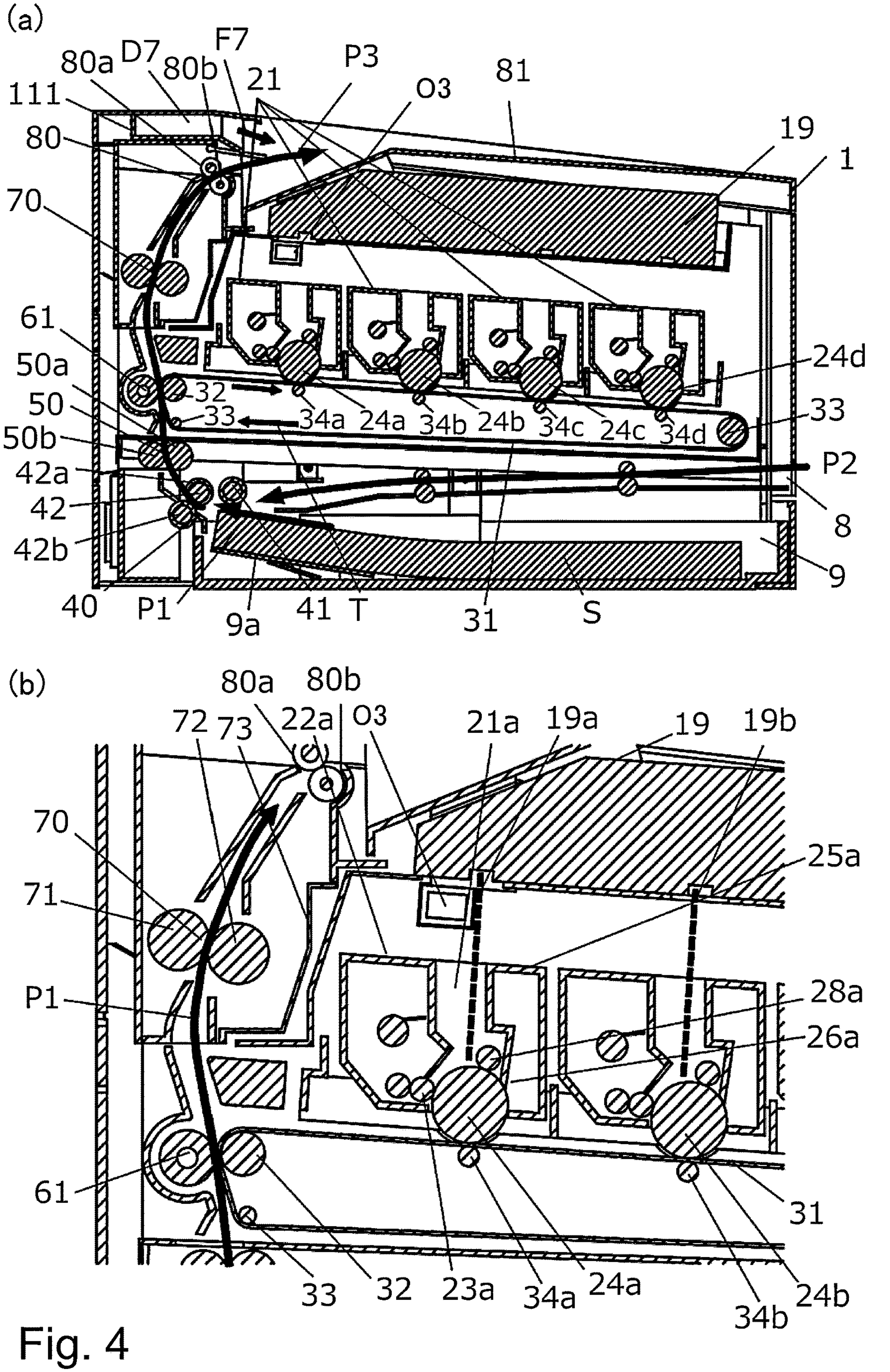
FIG. 4, part (a) and part (b), is a sectional view showing the internal configuration of the image forming apparatus according to the first embodiment, and a partial cross-sectional view showing an internal configuration around a cartridge.

Part (a) of FIG. 4 is a sectional view of the image forming apparatus 1. The image forming apparatus 1 includes the cassette 9, the manual feed portion 8, the supply/separation portion 40, a conveying portion 50 and the discharge portion 80. The image forming apparatus 1 includes two supply paths for the recording material S, and the recording material S can be replenished from both the cassette 9 and the manual feed portion 8. A conveyance passage P1 is a conveyance passage from a supply port of the cassette 9, the path P2 is a path from the manual feed portion 8, and a conveyance passage P3 is a conveyance passage downstream of the conveyance passage P1 and the path P2.

An image forming operation will be described below. The supply/separation portion 40 is provided with a supply roller 41, a separation roller pair 42, a supply drive motor 43, and the supply drive mechanism 44. When conveying the recording material S from the cassette 9, the supply roller 41 abuts against the uppermost recording material S among the recording materials S stacked on a stacking plate 9*a* of the cassette 9 and rotates to supply the recording material S downstream in a conveyance direction. Incidentally, the stacking plate 9*a* is supported by the cassette 9 so as to be swingable, and when the cassette 9 is accommodated in the image forming apparatus 1, the stacking plate plate 9*a* swings upward to a position where the recording material S can be supplied.

The separation roller pair 42 is comprised of a separation conveyance roller 42*a* and a separation roller 42*b*. The separation conveyance roller 42*a* contacts an upper surface of the recording material S and rotates so as to apply a conveying force to the recording material S to move it downstream. At the same time, the separation roller 42*b* applies resistance to the recording material S and the following recording material S in the direction opposite to the conveyance direction so that a plurality of recording materials S are not conveyed downstream. Only one sheet of recording material S can be conveyed downstream by the separation roller pair 42. In the first embodiment, the separation roller 42*b* is connected to a torque limiter (not shown) and separation is performed by the rotational resistance of the torque limiter; however, the separation system is not limited to this separation roller method. For example, a pad separation method using frictional force from a separation pad, or a retard method in which a separation roller obtains a driving force from the supply drive mechanism 44 and rotates in the opposite direction to the separation conveyance roller to perform separation may be used. When the recording material S of the manual feed portion 8 is to be conveyed, the recording material S is set in the manual feed portion 8 so that the recording material S can be conveyed along the path P2.

The conveying portion 50 will be described. The conveying portion 50 is mainly comprised of a conveyance roller 50*a*, a conveying roller 50*b*, and a conveyance sensor (not shown). Together with the conveying roller 50*b*, the conveyance roller 50*a* nips the recording material S supplied from the supply/separation portion 40 and conveys it further downstream. The conveyance sensor detects the leading end of the recording material S conveyed by the conveyance roller 50*a*, and it increases or decreases the rotational speed of the conveyance roller 50*a*. As a result, the position of the recording material S and the image transferred at a nip portion between the intermediary transfer belt 31 and the secondary transfer roller 61 is adjusted to fall within a predetermined range. The conveying portion 50 obtains a driving force from the supply drive motor 43.

The image forming apparatus 1 includes the laser scanner 19, the cartridges 21, the intermediary transfer belt 31, the primary transfer rollers 34 and the secondary transfer roller 61, all of which function as image forming means. The image forming apparatus 1 is comprised of a plurality of cartridges 21, each including a photosensitive drum 24 and a developing member 23, and the fixing device 70 configured to fix an unfixed toner carried on the recording material S. The cartridges 21 may have a configuration other than that in which the photosensitive drums 24 and the developing members 23 are integrated into one unit. For example, a cartridge provided with the photosensitive drums 24 and a cartridge provided with the developing members 23 may be configured as separate units which can independently be detached from the image forming apparatus 1.

Part (b) of FIG. 4 is a sectional view of the secondary transfer roller 61 and the periphery of a yellow cartridge 21*a* closest to the fixing device 70. The image forming process of the image forming apparatus 1 will be described. The cartridge 21*a* includes a toner holding container 22*a*, a developing member 23*a* (such as a developing roller), a photosensitive drum 24*a*, a waste toner holding container 25*a*, a cleaning portion 26*a* and a charge roller 28*a*. The charge roller 28*a* in the cartridge 21*a* applies an electrical charge to a surface of the photosensitive drums 24, which are rotating photosensitive members. As a result, when the laser scanner 19 appropriately irradiates the photosensitive drum 24*a* with a laser beam 19*a*, which is also rotating, an electrostatic latent image is formed on the photosensitive drum 24*a* by a potential difference. Incidentally, a laser beam 19*b* for forming a magenta toner image is also shown. The cartridge 21*a* includes the toner holding container 22*a* as a toner storage portion which stores and holds toner, and it supplies toner in the toner holding container 22*a* from the developing member 23*a* to the photosensitive drum 24*a*. The toner is transferred to the electrostatic latent image on the photosensitive drum 24*a*, thereby forming an image by the toner on the photosensitive drum 24*a*. The photosensitive drum 24*a*, the developing member 23*a* and the like obtain a driving force from a transfer drive motor 90*b* of the transfer drive portion 90 to rotate and operate each portion. The same applies to cartridges 21*b*, 21*c*, and 21*d* other than the cartridge 21*a*. Incidentally, the cartridge 21*b* corresponds to magenta, the cartridge 21*c* corresponds to cyan, and the cartridge 21*d* corresponds to black. The cartridges 21*a* to 21*d* respectively include photosensitive drums 24*a* to 24*d*, and primary transfer rollers 34*a* to 34*d* are disposed opposite to the photosensitive drums 24*a* to 24*d*, with the intermediary transfer belt 31 interposed therebetween. The image forming apparatus 1 also includes a driving roller 32 and a stretching roller 33.

The image forming apparatus 1 further includes a mechanism for operating each of the components described above and a mechanism for supplying a power supply voltage. The intermediary transfer belt 31 is held by the driving roller 32 and two stretching rollers 33 so as to prevent slack from occurring in the intermediary transfer belt 31, and it is rotationally moved in a moving direction T by the rotation of the driving roller 32. Four primary transfer rollers 34 (34*a*, 34*b*, 34*c*, 34*d*) are provided on an inner peripheral portion of the intermediary transfer belt 31. The primary transfer rollers 34 are configured to be switchable between a pressing position where they are in pressure contact with the intermediary transfer belt 31 and a separating position where they are separated from the intermediary transfer belt 31. In the image forming process, by placing the primary transfer rollers 34 in the pressing position, the intermediary transfer belt 31 is in pressure contact with the photosensitive drums 24, and by applying a transfer voltage, the toner image on the photosensitive drums 24 is transferred to the intermediary transfer belt 31 (hereinafter also referred to as primary transfer). Toner images are sequentially transferred in a superimposed manner from the photosensitive drums 24*a* to 24*d* of the respective cartridges 21*a* to 21*d* for yellow, magenta, cyan and black to the intermediary transfer belt 31, thereby forming a color image formed by toner of four colors on the intermediary transfer belt 31.

Incidentally, the intermediary transfer belt 31 and the driving roller 32 are also used in the transfer by the secondary transfer roller 61 (hereinafter also referred to as secondary transfer). Further, after the toner is primarily transferred from the photosensitive drums 24 to the intermediary transfer belt 31, that is, after the image is formed, the toner remaining on the photosensitive drums 24 is scraped off the photosensitive drums 24 by a cleaning portion 26. The scraped off toner is held in the waste toner holding container 25 as a waste toner storage portion included in the cartridges 21. The primary transfer rollers 34 obtain a driving force from the transfer drive motor 90*b* provided in the transfer drive portion 90, and they rotate and operate each portion.

The secondary transfer is performed by the intermediary transfer belt 31, the driving roller 32 and the secondary transfer roller 61. The recording material S conveyed from the conveying portion 50 is nipped between the driving roller 32 and the secondary transfer roller 61 via the intermediary transfer belt 31, and the transfer and conveyance are performed. A secondary transfer voltage is applied to the secondary transfer roller 61, and when the recording material S passes between the intermediary transfer belt 31 and the secondary transfer roller 61, the toner on the intermediary transfer belt 31 is transferred to the recording material S, forming a color image formed by the toner on the recording material S.

The fixing device 70 will be described. The fixing device 70 includes a fixing roller 71 which is a pressing roller, and a heating portion 72 which opposes the fixing roller 71 to form a nip portion. The fixing device 70 rotates while the fixing roller 71 and the heating portion 72 nip the recording material S onto which the color toner image has been transferred, and the fixing device 70 performs fixing by applying heat and pressure to the recording material S. The heating portion 72 includes inside a heater as a heat source, a fixing film, a heater holder and a supporting member, and increases the temperatures of the fixing roller 71 and the heating portion 72. The heater holder holds the heater and supports the fixing film to be rotatable. The supporting member supports the heater holder. A sensor is provided inside the heating portion 72 to detect a fixing temperature, and based on a detection result of the sensor, the amount of heat generated by the heater is controlled so that a fixing nip portion formed by the fixing roller 71 and the heating portion 72 reaches a predetermined temperature. The fixing device 70 is heated by the heater so that the temperature reaches a predetermined level before the recording material S onto which the image has been transferred reaches the fixing device 70. The recording material S passes between the fixing roller 71, which has reached the predetermined temperature, and the heating portion 72, thereby fixing the image formed by the toner transferred onto the recording material S. Incidentally, the predetermined temperature varies depending on the environment in which the image forming apparatus 1 is placed, the type of recording material S used, and various other conditions. The fixing device 70 obtains a driving force from a fixing drive motor 91*b* of the fixing drive portion 91 to rotate each portion and convey the recording material S. The fixing device 70 includes a fixing cover 73 for shielding the heating portion 72 from the outside.

The discharge portion 80 will be described with reference to part (a) of FIG. 4. The discharge portion 80 includes a discharge roller 80*a*, a discharge guide, and various sensors for detecting the presence or absence of the recording material S. The discharge roller 80*a* and a discharge roller 80*b* nip and convey the recording material S onto which the image has been fixed by the fixing device 70. Various sensors detect a width and a length of the conveyed recording material S. Incidentally, the width refers to a length in a direction perpendicular to the conveyance direction of the recording material S, and the length refers to a length in the conveyance direction. The discharge tray 81 is provided downstream of the discharge portion 80, onto which the discharged recording material S is stacked.

On the upper portion of the discharge portion 80 is included the duct 111 for generating air F7, which is air flow to lower the temperature of the recording material S heated by the fixing device 70, and an air passage D7 formed by the duct 111. Incidentally, the duct 111 will be described below. In this case, if the side of the recording material S onto which the image has been transferred is a printing surface, the air F7 is blown so as to hit a non-printing surface on the opposite side of the printing surface. Incidentally, the configuration may be such that the air passage D7 is formed so that the air F7 hits the non-printing surface.

Next, the configuration around the power source portion 100 will be described. The power source portion 100 is an electronic circuit board (low-voltage power source board) which supplies power, which is supplied via the socket 103, to each unit provided inside the image forming apparatus 1. The socket 103 is connected to a cable which is connected to an external power source such as an electrical outlet.

[Cooled Parts]

The configuration of the first embodiment will be described with reference to FIGS. 2 to 9. Some electronic components mounted on a power source board 100*a* generate heat during operation. Further, each electronic component has its respective upper limit temperature at which it can operate normally. If there are any electronic components that may reach a high temperature, they need to be controlled to remain below their upper limit temperature. Further, the cartridges 21 contain toner, which has a characteristic of being denatured by heat. Once the toner reaches a high temperature, there is a possibility that subsequent image forming operations will be affected. In other words, the cartridges 21 have an upper limit temperature at which they can perform normal operations in a stable manner. Further, since the recording material S being discharged has just been heated by the fixing device 70, it is at a relatively high temperature. When the toner fixed to the recording material S is discharged to the discharge tray 81 while still in a high temperature state, if the toner comes into contact with a previously stacked recording material S, the previously discharged recording material S and the next discharged recording material S may be stuck together by the toner. In other words, it is necessary to keep the temperature of the recording material S during discharge at or below a predetermined temperature.

Accordingly, in the first embodiment, the cartridges 21, the power source portion 100 and the discharge portion 80 are parts that require cooling. In the first embodiment, the configuration is as follows so as to keep the temperatures of the electronic components of the power source portion 100, the cartridges 21 and the recording material S being discharged below a predetermined temperature. In other words, the image forming apparatus 1 is provided with a blower 110 such as a fan and the duct 111 so as to guide the outside air into the inside of the image forming apparatus 1 and blow the guided outside air onto electronic components 100*b* (see part (a) of FIG. 3), the cartridges 21 and the recording material S being discharged, thereby performing cooling.

[Blower]

Figure 5:
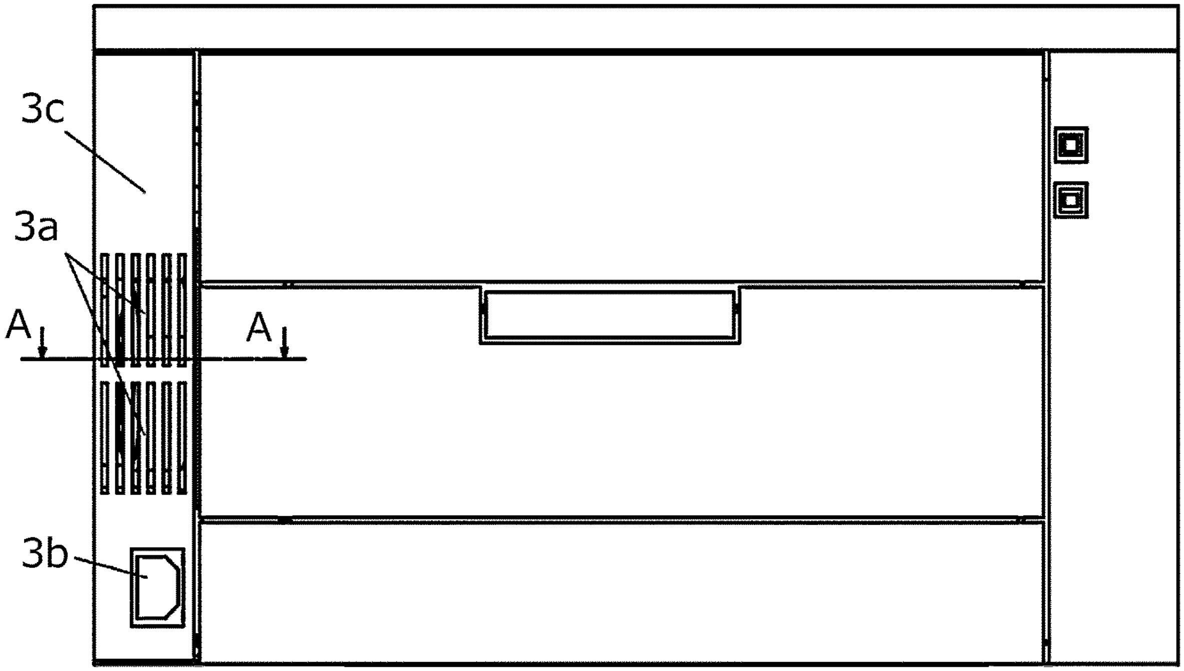
FIG. 5, part (a) and part (b), is a view of the image forming apparatus according to the first embodiment as seen from the rear side, and a partial cross-sectional view showing a configuration around a suction opening.
Figure 5:
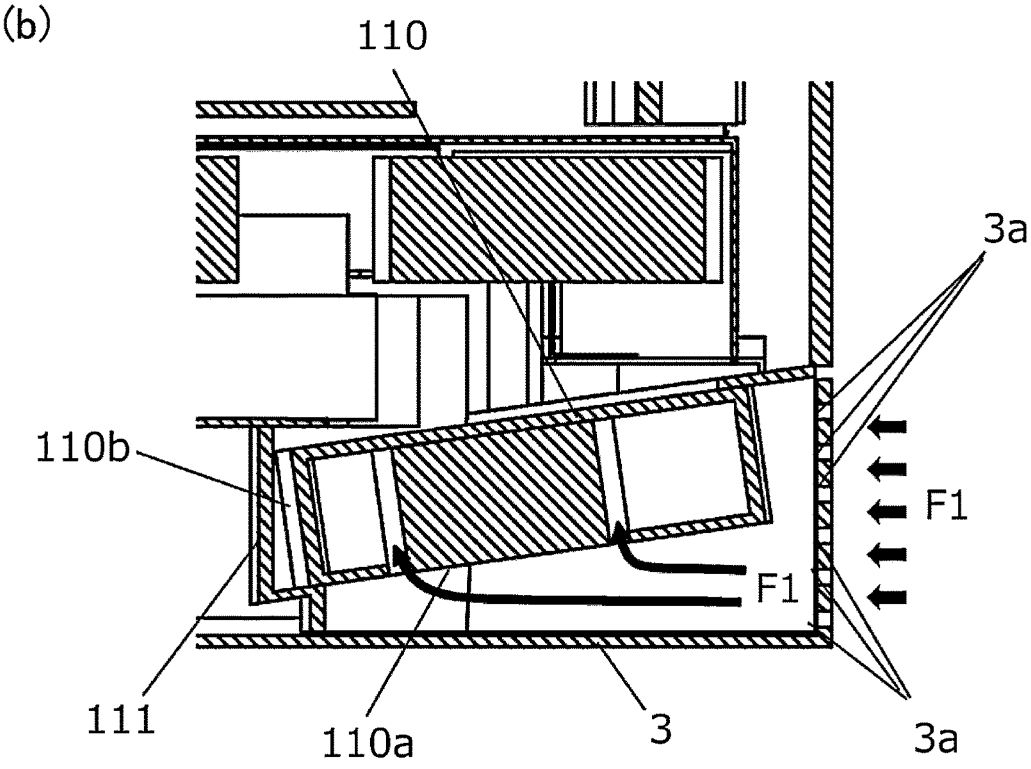

Part (a) of FIG. 5 is a view of the image forming apparatus 1 as seen from the rear side. The suction opening 3*a* is provided on the rear side of the image forming apparatus 1 on a back surface 3*c* which is a back surface portion of the right cover 3. The suction opening 3*a* is an opening group including a plurality of openings for taking the air into the blower 110. Here, below the suction opening 3*a* on the back surface 3*c*, there is the opening 3*b* through which the socket 103 is exposed. When operating the image forming apparatus 1, a cable connected to a power source is inserted into the socket 103; however, in this case, the cable protrudes from the back surface 3*c*, so a certain amount of space is required on the back surface side, making it difficult to dispose the back surface portion of the image forming apparatus 1 close to a wall or the like with no gaps. In other words, disposing the suction opening 3*a* in this position makes it difficult to position the back surface portion of the image forming apparatus 1 close to a wall. For this reason, by having the suction opening 3*a* blocked by a wall, it is possible to prevent guiding the outside air into the inside of the image forming apparatus 1 (hereinafter also referred to as the inside of the apparatus) from being difficult.

Part (b) of FIG. 5 is a partial cross-sectional view of the vicinity of the blower 110 taken along an AA cross section in part (a) of FIG. 5, with the right side of the Figure being the back surface side of the image forming apparatus 1 and the left side of the Figure being the front side of the image forming apparatus 1. The blower 110 includes a suction opening 110*a* and a blower opening 110*b*, and it takes in the air through the suction opening 110*a* and blows out the air from the blower opening 110*b*. The blower 110 is provided in a side of the outside of the right frame 12. The blower 110 is preferably a sirocco fan. The blower 110 sucks in air F1 sucked in from the suction opening 3*a* through the suction opening 110*a* of the blower 110 positioned at the center, and it blows out air F1 from the blower opening 110*b* toward the substantially front direction of the image forming apparatus 1.

The blower 110 is disposed such that a surface on which the suction opening 110*a* is provided is inclined with respect to the direction in which the air is taken in through the suction opening 3*a*. In other words, the blower 110 is provided at an incline with respect to the inner wall of the right cover 3 such that the air passage of the outside air sucked in toward the suction opening 3*a*, which is the back surface direction of the image forming apparatus 1, widens. Conversely, the blower 110 is disposed at an incline so that the air passage narrows as the outside air sucked in flows toward the suction opening 110*a* of the blower 110. Incidentally, compared to axial fans, sirocco fans have an advantage of having higher wind pressure and can blow the air even if the air passage downstream in the direction of the air flow is complex. Further, by disposing the sirocco fan and the suction opening 3*a* of the image forming apparatus 1 in this manner, the size in a width direction of the image forming apparatus 1 can be made shorter compared to when the suction opening 110*a* of the sirocco fan is disposed to oppose the suction opening 3*a*.

[Duct]

As described with reference to part (a) of FIG. 3, the right frame 12 is provided with the transfer drive frame 90*a* and the fixing drive frame 91*a*, which are drive frames. The transfer drive frame 90*a* is provided with the transfer drive motor 90*b*, and the fixing drive frame 91*a* is provided with the fixing drive motor 91*b*. As shown in part (a) of FIG. 3, the transfer drive motor 90*b* and the fixing drive motor 91*b* have cylindrical shapes with predetermined heights, and respectively protrude from the transfer drive frame 90*a* and the fixing drive frame 91*a* toward the outside of the apparatus. For this reason, when the right cover 3 is mounted, a space is formed in a part covered by the right cover 3, and in the first embodiment, the blower 110 and the duct 111 are disposed in this space. In other words, the duct 111 is disposed inside a space formed when the right frame 12 is covered by the right cover 3, avoiding the transfer drive motor 90*b* and the fixing drive motor 91*b* (see part (a) of FIG. 2). As a result, the need to provide a separate space to dispose the blower 110 and the duct 111 is eliminated, thereby preventing the image forming apparatus 1 from becoming large.

Figure 6:
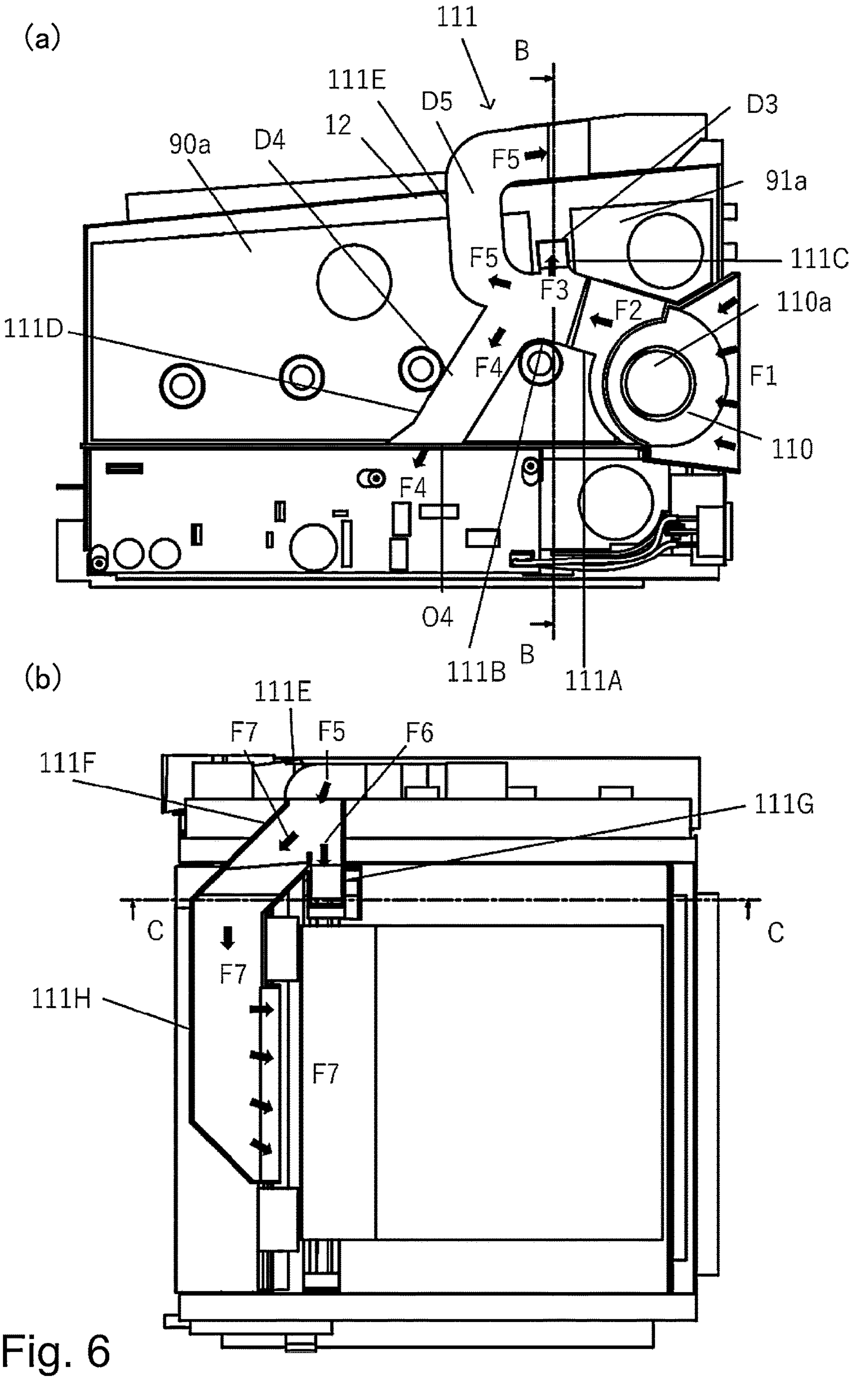
FIG. 6, part (a) and part (b), is a view showing the internal configuration of the image forming apparatus according to the first embodiment.
Figure 7:
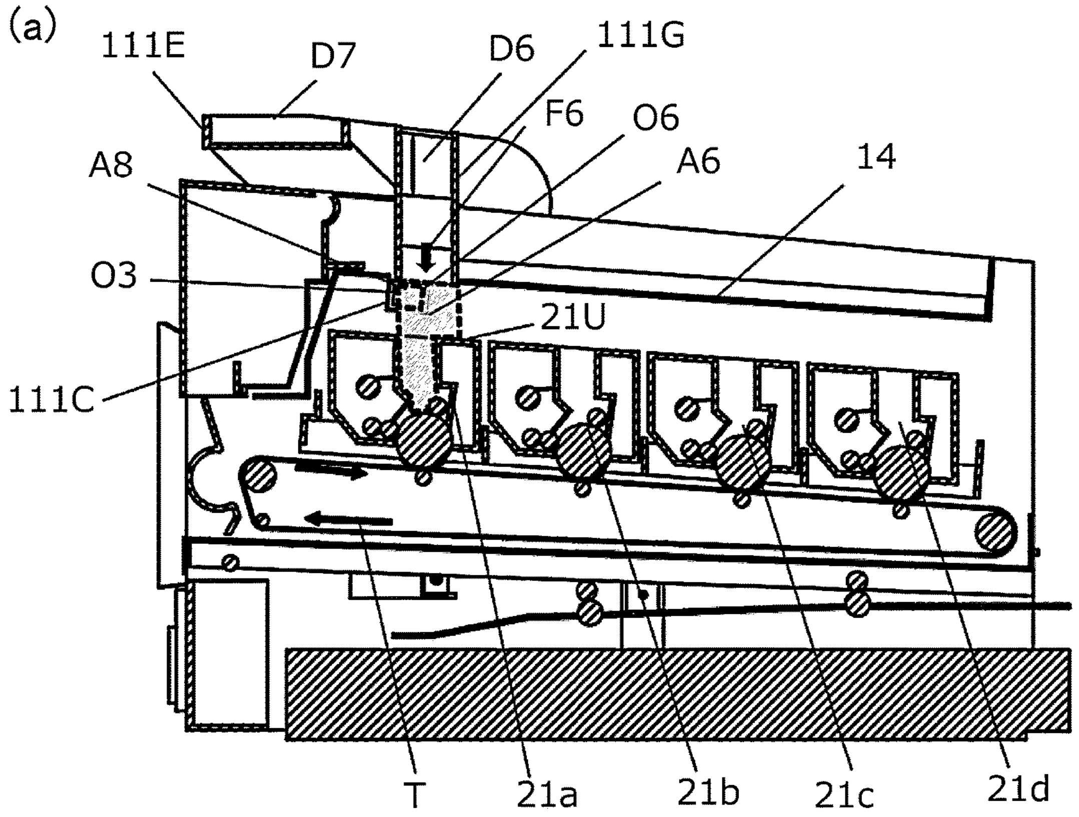
FIG. 7, part (a) and part (b), is a view showing the internal configuration of the image forming apparatus according to the first embodiment.
Figure 7:
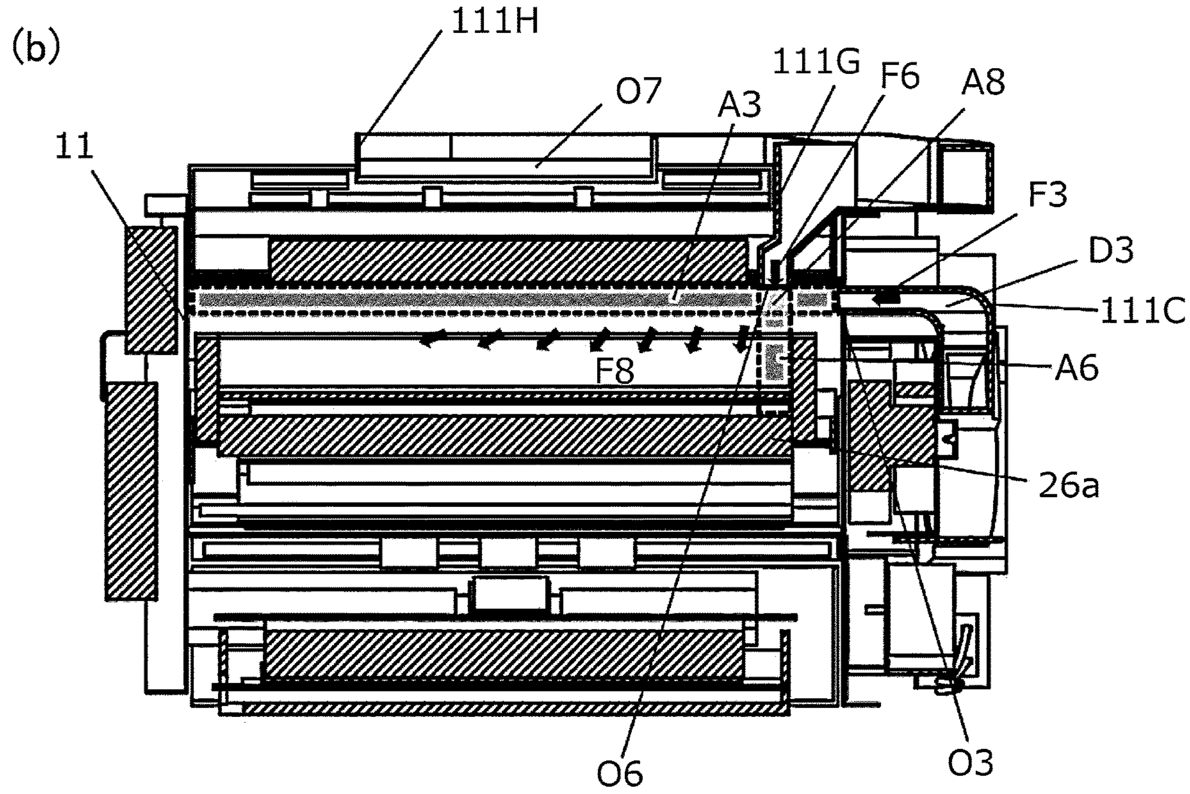

Part (a) of FIG. 6 is a view of the inside of the image forming apparatus 1 as viewed from the right side, with the cover of the apparatus not shown, and part (b) of FIG. 6 is a view of the image forming apparatus 1 as viewed from above the apparatus. Part (a) of FIG. 7 is a sectional view of the inside of the apparatus taken along a CC cross section in part (b) of FIG. 6. Part (b) of FIG. 7 is a sectional view of the inside of the apparatus taken along a BB cross section in part (a) of FIG. 6.

The blower opening 110*b* of the blower 110 is connected to the duct 111. The duct 111 guides the air blown out from the blower opening 110*b* of the blower 110 to the cartridge 21*a*, which is a predetermined cartridge positioned closest to the fixing device 70 among the plurality of cartridges 21*a* to 21*d*. Incidentally, of the two surfaces of the cartridges 21 that cross in the vertical direction, a surface positioned above in the vertical direction is referred to as a top surface 21U (see part (a) of FIG. 8 and the like). Incidentally, in the following description, a first direction is a direction in which air F6 described below flows, and a second direction is a direction in which air F3 described below flows.

The duct 111 includes a first part and a second part on one end side of the cartridge 21*a* in the rotational axis direction of the photosensitive drum 24*a*. The first part of the duct 111 is a part that blows out the air in the first direction toward downward from upward in a vertical direction with respect to the top surface 21U (see part (a) of FIG. 7). The second part of the duct 111 is a part that blows out the air in the second direction along the rotational axis direction of the photosensitive drums 24 above the vertical direction of the top surface 21U (see part (b) of FIG. 7). The duct 111 also includes a third part. The third part is a part that branches from the first and second parts and blows out the air blown out from the blower opening 110*b* in a third direction along the right frame 12 toward the power source portion 100 (see part (a) of FIG. 6). The third direction is a direction in which air F4 described below flows. Furthermore, the duct 111 includes a fourth part that branches from the first part and blows out the air in the direction in which the recording material S is discharged from the discharge portion 80. In the first embodiment, the first part is perpendicular to the top surface 21U, and the second part is parallel to the top surface 21U.

More specifically, as shown in FIGS. 6 and 7, the duct 111 branches so that the air can be directed to the cartridges 21, the power source portion 100 and the discharge portion 80 described above. The duct 111 is a general term for ducts 111A, 111B, 111C, 111D, 111E, 111F, 111G and 111H. Further, the ducts 111A, 111B and 111C can be referred to as the first part of the duct 111, and the ducts 111A, 111B, 111E and 111G can be referred to as the second part of the duct 111. Further, the ducts 111A, 111B and 111D can be referred to as the third part of the duct 111. Furthermore, the ducts 111A, 111B, 111E, 111F and 111H can be referred to as the fourth part of the duct 111.

The duct 111A is a part that is connected to the blower opening 110*b* of the blower 110 and guides the outside air to the duct 111. The duct 111B is a first branching portion which branches the duct 111 so as to branch and guide the outside air guided via the duct 111A to the cartridges 21, the power source portion 100 and the discharge portion 80.

The duct 111C branches from the duct 111B, and is provided to blow out the guided outside air in a direction along the longitudinal direction of the cartridges 21. The duct 111C is a part that passes through the aforementioned cutout portion 92 and the opening 12*b* and extends toward the inside of the apparatus, which is a direction crossing the transfer drive frame 90*a* (or the right frame 12). The duct 111C in the first embodiment is perpendicular to the transfer drive frame 90*a* (or the right frame 12) and extends parallel to the rotational axis direction of the photosensitive drums 24. The duct 111C includes an opening portion O3 on the downstream side in the air flow direction through which the air is blown out (see FIG. 7 and the like).

The duct 111D is a part that branches from the duct 111B and extends diagonally downward to the left in part (a) of FIG. 6, which is a direction along a surface of the transfer drive frame 90*a* (or the right frame 12), so as to blow out the guided outside air toward the power source portion 100. As a result, in the first embodiment, the air F4 guided by the duct 111D is blown out from the upper right of the power source board 100*a*. The duct 111D includes an opening portion O4 on the downstream side in the air flow direction through which the air is blown out (see part (a) of FIG. 6 and the like).

The duct 111E is a part that branches from the duct 111B and extends upward in part (a) of FIG. 6, which is a direction along a surface of the transfer drive frame 90*a* (or the right frame 12), so as to blow out the guided outside air to the cartridges 21 and the discharge portion 80. The duct 111E in the first embodiment extends upward along the surface of the transfer drive frame 90*a* (or the right frame 12), then it switches direction to right while following that surface, and it connects to the duct 111F described below. In other words, the duct 111E does not pass through the right frame 12 like the duct 111C, but it is routed on the outside the right frame 12. It can be said that the duct 111E connected to the duct 111G blows out the air by bypassing the right frame 12 from above in a vertical direction. As a result, the air flowing from the duct 111E to the duct 111F, then to the duct 111G can cross the air flowing from the duct 111C.

The duct 111F is a second branching portion which branches the duct 111 so as to branch and guide the outside air guided via the duct 111E to the cartridges 21 and the discharge portion 80. The duct 111F extends in a direction along an imaginary plane parallel to the main frame 13 and toward the inside of the apparatus.

The duct 111G is a part that branches from the duct 111F and blows out the guided outside air from above the cartridges 21 downward, that is, toward the top surface 21U of the cartridges 21. As shown in part (a) of FIG. 7, the duct 111G switches direction from a direction along the imaginary plane parallel to the main frame 13, and extends from top to bottom along an imaginary plane parallel to the transfer drive frame 90*a* (or the right frame 12). The duct 111G includes an opening portion O6 on the downstream side in the air flow direction through which the air is blown out.

The duct 111H is a part that branches from the duct 111F and blows out the guided outside air toward the discharge portion 80. As shown in part (b) of FIG. 6, the duct 111H extends in a width direction (crosswise direction) of the image forming apparatus 1, which is a direction along an imaginary plane parallel to the main frame 13. Incidentally, in the first embodiment, the upstream parts of the ducts 111F and 111H in the air flow direction are inclined with respect to the width direction so as to absorb a difference in the positions of the ducts 111E and 111H in the front-rear direction. The duct 111H includes an opening portion O7 on the downstream side in the air flow direction through which the air is blown out (see part (b) of FIG. 7 and the like).

Further, in the following description, a space formed by the inner walls of the duct 111 is referred to as an air passage D. In particular, a space formed by the inner walls of the duct 111C is an air passage D3, a space formed by the inner walls of the duct 111D is an air passage D4, and a space formed by the inner walls of the duct 111E is an air passage D5. Furthermore, a space formed by the inner walls of duct 111G is an air passage D6, and a space formed by the inner walls of the duct 111H is the air passage D7.

Further, the duct 111 has a plurality of branched ends, at which the outside air guided by the blower 110 is blown onto the cartridges 21, the power source portion 100 and the discharge portion 80. The ends of the duct 111 are the opening portion O3 of the duct 111C, the opening portion O4 of the duct 111D, the opening portion O6 of the duct 111G and the opening portion O7 of the duct 111H, as described above.

Furthermore, the air flow in the air passage D is designated as air F. More specifically, the air flow taken into the suction opening 110*a* of the blower 110 is referred to as the air F1, the air flow in the duct 111A is referred to as air F2, and the air flow in the duct 111C, that is, in the air passage D3, is referred to as the air F3. The air flow in the duct 111D, that is, in the air passage D4, is referred to as the air F4, the air flow in the duct 111E, that is, in the air passage D5, is referred to as air F5, the air flow in the duct 111G, that is, in the air passage D6, is referred to as the air F6, and the air flow in the duct 111H, that is, in the air passage D7, is the air F7. Air F8 will be described below.

[Air Flow]

As shown in FIG. 2 and the like, the sucked air F1 is blown out as the air F2 from the blower opening 110*b* of the blower 110, and it is further branched into the airs F3, F4 and F5 by the ducts 111C, 111D and 111E which are provided downstream in the air flow direction. The air F3 passes through the air passage D3 provided between the transfer drive frame 90*a* and the fixing drive frame 91*a*, and it is then sent through the opening 12*b* in the right frame 12 into a space surrounded by the right frame 12, the left frame 11, the main frame 13 and the scanner frame 14. The air F4 passes through the air passage D4, and it is sent to the power source portion 100 from the end of the air passage D4, that is, from the opening portion O4 of the duct 111D. The air F5 passes through the air passage D5, passes above the right frame 12, and is sent to a space sandwiched between the right frame 12 and the left frame 11. As shown in part (b) of FIG. 6, the air F5 is branched into the airs F6 and F7 by the duct 111F provided further downstream.

As shown in part (a) of FIG. 7, the air F6 passes through the air passage D6 and is sent toward the bottom of the image forming apparatus 1 from the end of the air passage D6, that is, from the opening portion O6 of the duct 111G toward the yellow cartridge 21*a* closest to the fixing device 70. In this case, a region A6, which is an imaginary first region obtained by extending the opening portion O6, includes the top surface 21U of the cartridge 21*a* and the photosensitive drum 24*a*. Here, the region A6 is also a region where the air F6 blown out from the opening portion O6 flows while diffusing without being restricted by the duct 111, and it is a region that extends mainly in a direction along an imaginary vertical plane.

The heat of the yellow cartridge 21*a*, which is closest to the fixing device 70, is transmitted through the photosensitive drums 24 and the intermediary transfer belt 31 to the cartridges 21*b* to 21*d* provided downstream, which is in the moving direction T of the intermediary transfer belt 31. Accordingly, directly applying the air F6 to the photosensitive drum 24*a* effectively reduces the amount of heat transfer described above, and it is therefore also effective in suppressing temperature increases in the other cartridges 21*b* to 21*d*.

As shown in part (b) of FIG. 7, the air F3 passes through the air passage D3, and is sent from the end of the air passage D3, that is, from the opening portion O3 of the duct 111C into a space surrounded by the cartridges 21, the scanner frame 14, the right frame 12 and the left frame 11. In this case, the air F3 is sent in a direction approximately parallel to the rotational axis of the photosensitive drums 24. The air F6 passes through the air passage D6 and is sent from the end of the air passage D6, that is, from the opening portion O6 of the duct 111G into the space surrounded by the cartridges 21, the scanner frame 14, the right frame 12 and the left frame 11, in a direction approximately perpendicular to the rotational axis of the photosensitive drums 24.

In this case, a region A8 is where a region A3 (region in a horizontal plane), which is an imaginary second region obtained by extending the opening portion O3, crosses a region A6 (region in a vertical plane), which is an extension of the opening portion O6. Here, the region A3 is also a region where the air blown out from the opening portion O3 flows while diffusing without being restricted by the duct 111C, and it is a region that extends mainly in a direction along an imaginary horizontal plane. When air flowing in different directions, that is, the air flowing through the region A3 and the air flowing through the region A6, intersect, the air F8 which includes a turbulent component is generated.

Figure 9:
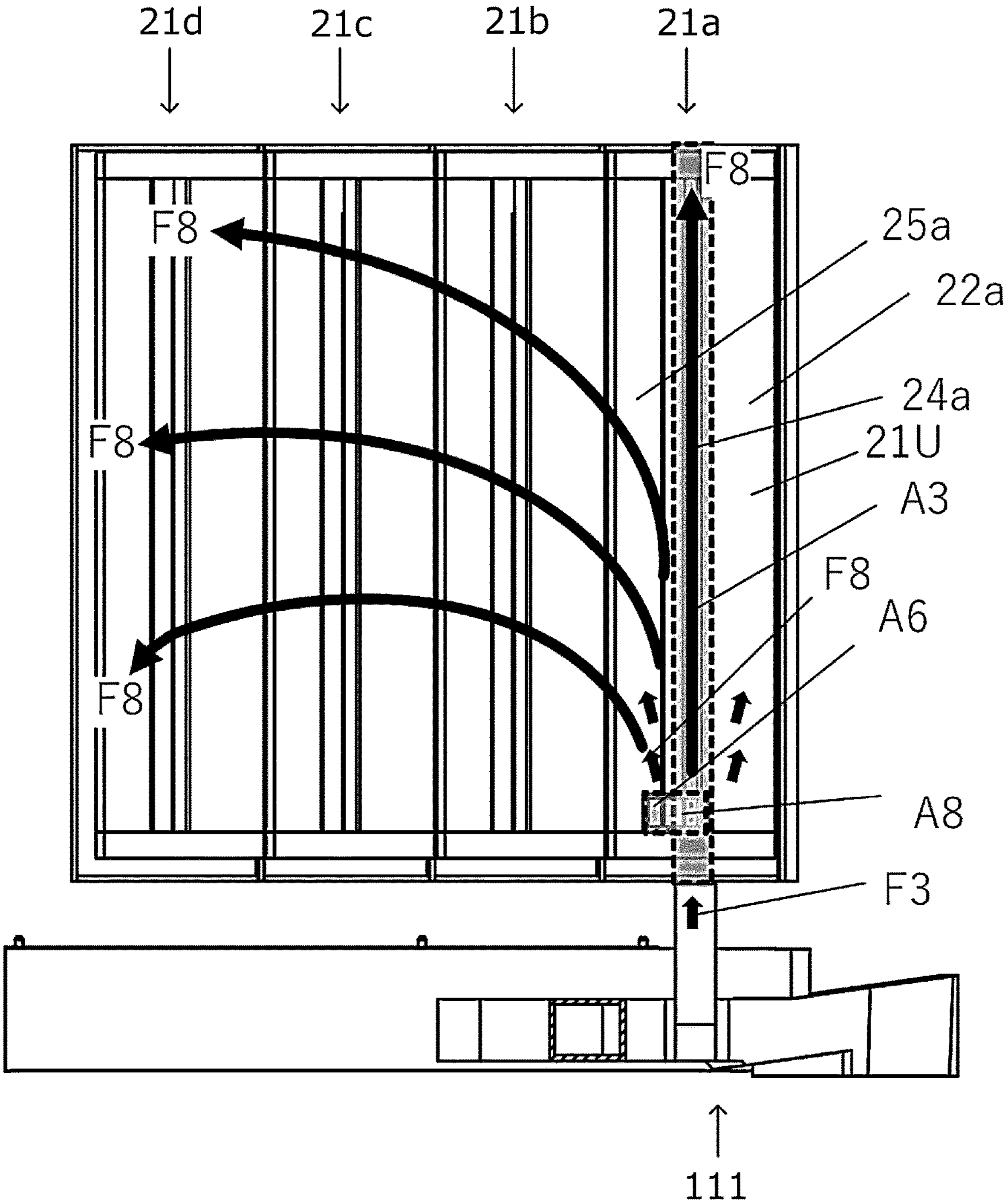
FIG. 9 is a view showing a flow of air F8 in the first embodiment.

As shown in part (b) of FIG. 7, in a vertical cross section, the air F8 flows from the upper right to the lower left as a result of a collision between the air F3 flowing horizontally from right to left and the air F6 flowing vertically from top to bottom. Further, as shown in FIG. 9, in a horizontal cross section, the air F8 not only flows from the end portion where the opening portions O3 and O6 of the yellow cartridge 21*a* are provided to the other end, but also flows toward each end portion of the other cartridges 21*b* to 21*d*.

If the cartridges 21 are cooled only by the air F6, only a portion of one end side of the photosensitive drum 24*a* will be strongly cooled. Even if some heat transfer occurs inside the photosensitive drum 24*a*, the photosensitive drum 24*a* will be cooled unevenly. Further, if the opening portion O3 is cooled only by directing the air F3 toward the cartridges 21, portions of the cartridge 21*a* that are first hit by the air F3 will be cooled strongly, while the other portions will be cooled unevenly, as in the case of using only the air F6. Further, in either case, it is difficult to cool the wide area of the other cartridges 21*b* to 21*d*. In other words, as in the first embodiment, by having the airs F3 and F6 from different directions intersect and become turbulent while spreading the air flow over a wide area, it is possible to prevent the temperature distribution from becoming uneven when cooling the cartridges 21*a* to 21*d*.

As mentioned above, since the cartridges 21 contain toner, attention must be paid to the portion of the cartridges 21 where the temperature becomes the highest. If the cartridges 21 are cooled unevenly, it is necessary to prevent the temperature of the parts to which not much air is applied and become hot, rather than the parts to which the air is applied and whose temperature decreases, from exceeding a predetermined value. In other words, if cooling is not uniform, it cannot be said to be efficient cooling. As in the first embodiment, it is possible to perform effective cooling by applying and spreading the air entirely over the cartridges 21 to lower their temperature.

In this way, the air F6 blown out from the duct 111G and the air F3 blown out from the duct 111C collide with each other above the top surface 21U of the toner cartridge 21*a*. This can also be said to mean that the region A6 formed by extending the opening portion O6 in the flow direction of the air F6 and the region A3 formed by extending the opening portion O3 in the flow direction of the air F3 cross above the top surface 21U of the toner cartridge 21*a*.

Figure 8:
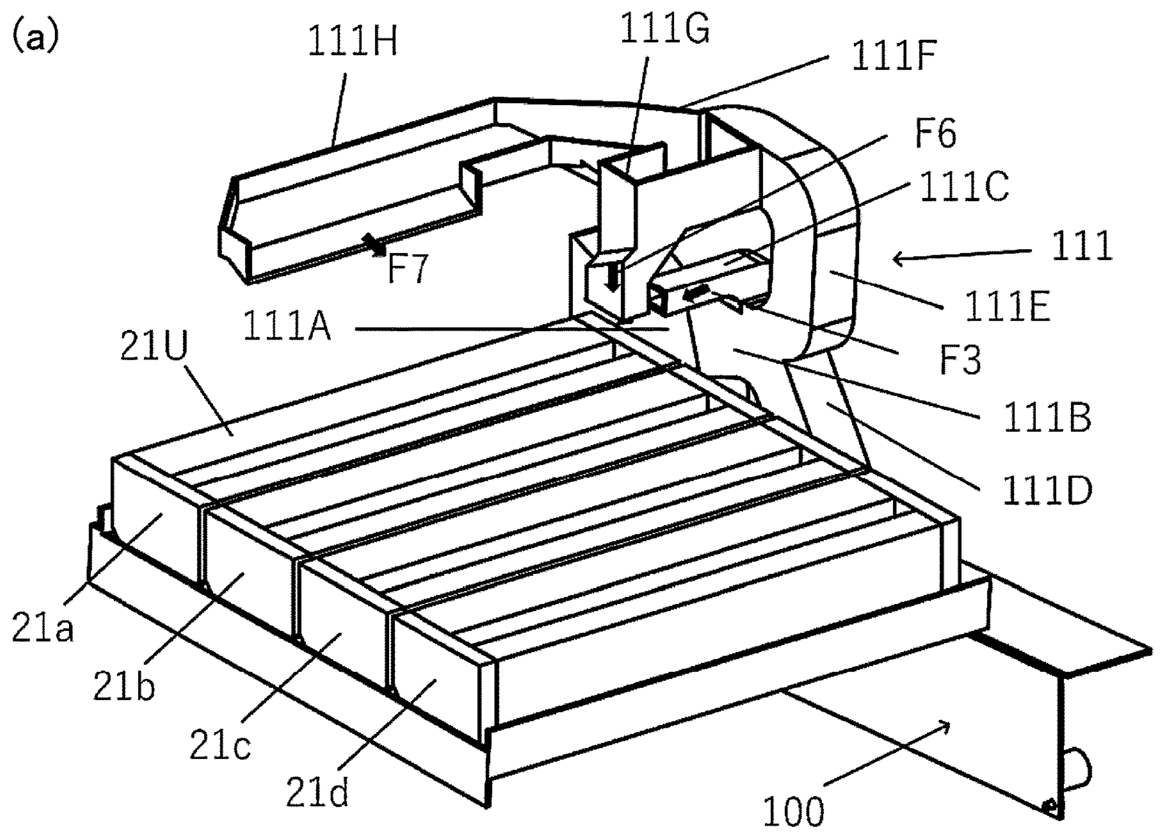
FIG. 8, part (a) and part (b), is a view showing the internal configuration of the image forming apparatus according to the first embodiment.
Figure 8:
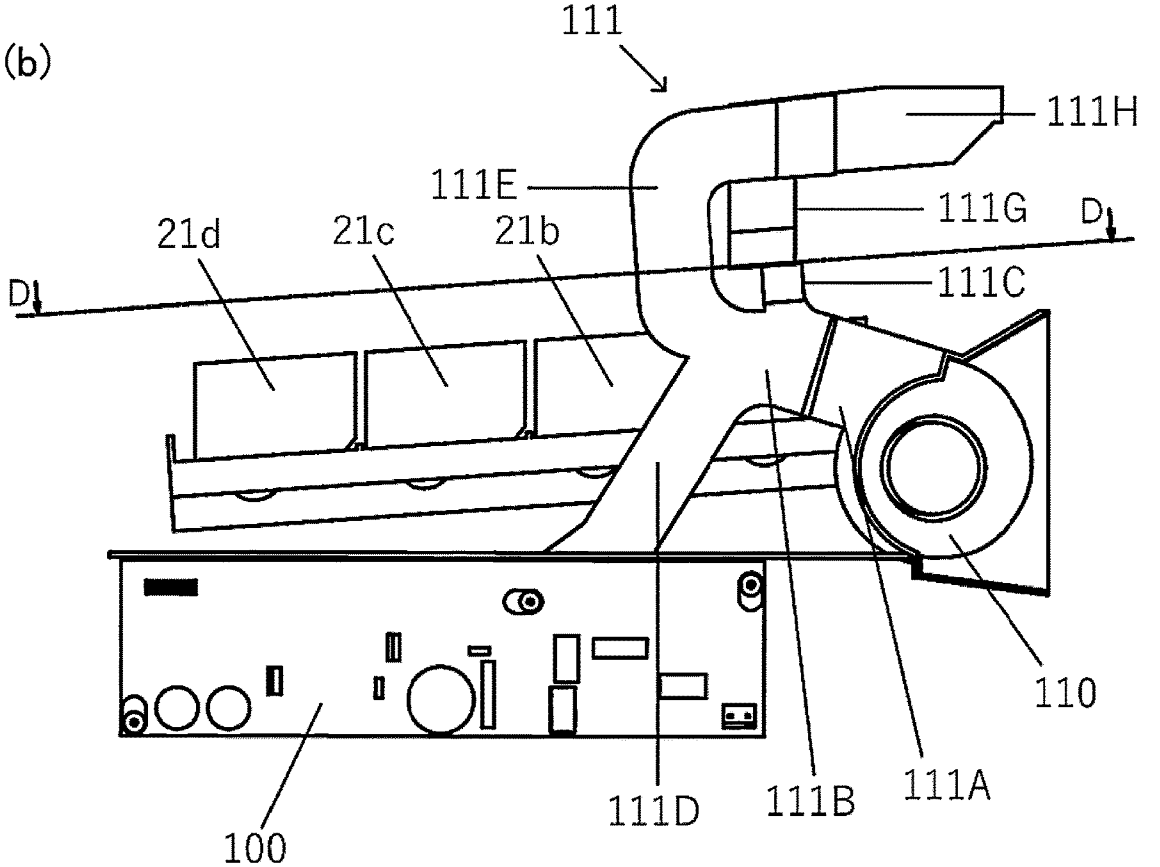

FIGS. 8 and 9 are views showing the blower 110, the duct 111, the cartridges 21 and the power source portion 100. Part (a) of FIG. 8 is a perspective view. Part (b) of FIG. 8 is a view of the image forming apparatus 1 as seen from the right side. FIG. 9 is a sectional view taken along a DD cross section in part (b) of FIG. 8. As shown in FIGS. 6 and 7, when the airs F3 and F6 intersect, the air F8 which flows in a different direction than the airs F3 and F6 is generated, and the cartridge 21*a* can also be cooled over a wide area in the front-rear direction of the image forming apparatus 1.

In the first embodiment, the air passage D7 to the discharge portion 80 and the air passage D6 to the cartridge 21*a* are shared up to a certain point as the air passage D5, and the air passage D3 to the cartridge 21*a* is not provided on the cartridges 21*a* to 21*d* for all four colors, but is only provided on the cartridge 21*a* which is closest to the fixing device 70. As a result, the space required for providing the duct 111 can be reduced. Further, by making the flow of the airs F3 and F6 intersect midway, the local cartridge 21 is not cooled by a linear air, but instead the air F8 is turbulent and spreads, making it possible to cool the cartridges 21*a* to 21*d* entirely and appropriately. Here, the local cartridge 21 refers to the cartridge 21*a*.

Incidentally, since there are heat-generating units in various parts inside the apparatus and the temperature is often higher than the outside air, it is desirable to directly guide the outside air as the air (wind) sent to the power source portion 100 and the cartridges 21; however, the present invention is not limited thereto. For example, even if there is a heat generating member on the path that guides the air from the outside air to the power source portion 100 via the blower 110, there is still a cooling effect as long as the temperature of the air being guided is lower than that of the power source portion 100 to be cooled.

Figure 10:
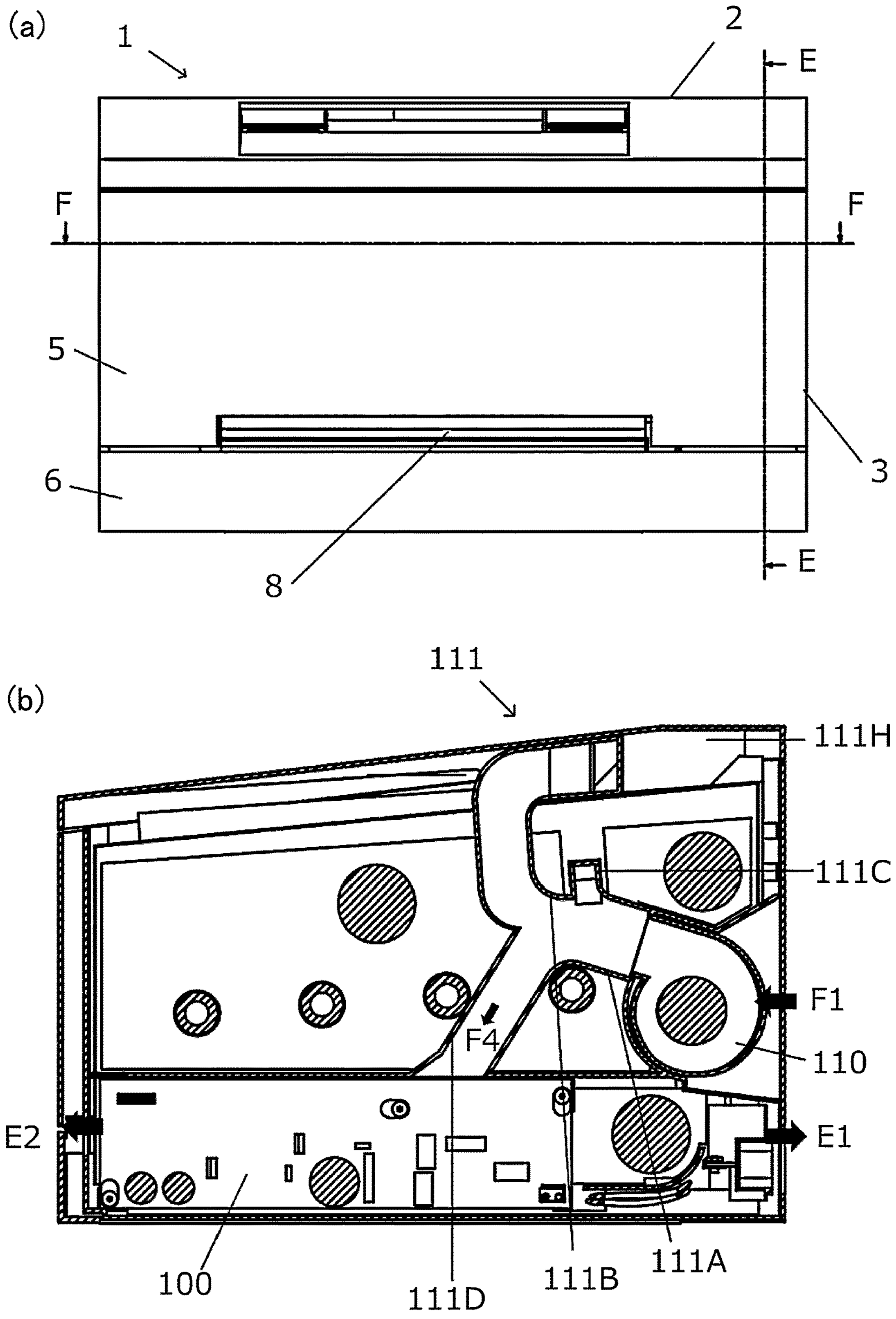
FIG. 10, part (a) and part (b), is a view showing the internal configuration of the image forming apparatus according to the first embodiment.

Finally, exhaust from inside the image forming apparatus 1 will be described. Part (a) of FIG. 10 is a view of the image forming apparatus 1 as viewed from the front side. In part (b) of FIG. 10, which is a sectional view taken along an EE cross section in part (a) of FIG. 10, the aforementioned air F1 is sucked in from the suction opening 3*a*, branched by the duct 111 and blown toward the power source portion 100 as the air F4. This air F4 is exhausted mainly in the direction of an arrow E2 to the outside of the image forming apparatus 1 (hereinafter also referred to as the outside of the apparatus) through gaps in the exterior portion and louvers (not shown) of the image forming apparatus 1. Further, a portion of the air F4 is exhausted to the outside of the apparatus in the direction of an arrow E1 through gaps in the opening 3*b* and gaps in the exterior portion.

Figure 11:
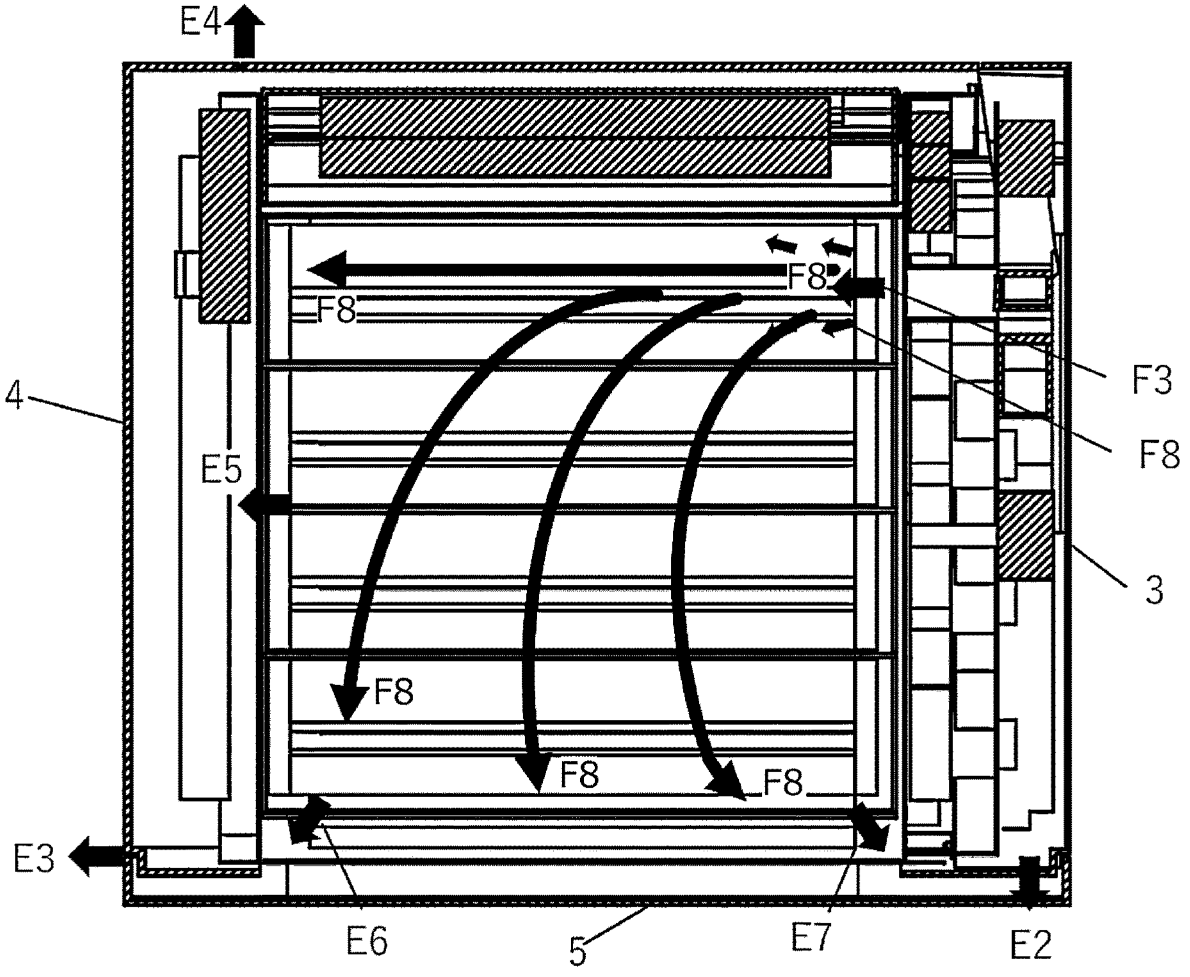
FIG. 11 is a view showing the flow and exhaust of the air F8 in the first embodiment.

In FIG. 11, which is a sectional view taken along an FF cross section in part (a) of FIG. 10, the airs F3 and F6 blown into the space surrounded by the right frame 12, the left frame 11, the main frame 13 and the scanner frame 14 move as follows. First, some of the airs F3 and F6 move into a space surrounded by the left frame 11 and the left cover 4 in the direction of an arrow E5 through an opening (not shown) and the like in the left frame 11. Further, some of the airs F3 and F6 move inside the apparatus through a gap between the left frame 11 and the front door 5 in the directions of arrows E6 and E7. Furthermore, some of the airs F3 and F6 are exhausted to the outside of the apparatus in the directions of an arrow E3 and the arrow E2 through louvers (not shown) of the cover of the image forming apparatus 1 or gaps in the exterior portion.

Incidentally, in the first embodiment, a configuration has been described in which the air guided to the inside of the apparatus by one blower 110 is branched to cool each part; however, a configuration using a plurality of blowers 110 may also be used. For example, another blower and duct may be provided on a surface opposite to the surface on which the blower 110 and the duct 111 are provided (on the left frame 11 side).

As described above, according to the first embodiment, it is possible to reduce the size of the image forming apparatus while efficiently disposing the air passages to cool the plurality of cartridges, thereby reducing costs.

Embodiment 2

Next, a second embodiment will be described. Incidentally, the same components as those described in the first embodiment are designated by the same reference numerals and detailed descriptions thereof will be omitted. In the second embodiment, in addition to the configuration of the first embodiment, the cartridges 21 include communication portions 201 for communicating with the main assembly, and the main assembly includes a communication unit 210 for communicating with the cartridges 21.

[Communication Portions 201, Communication Unit 210]

Figure 12:
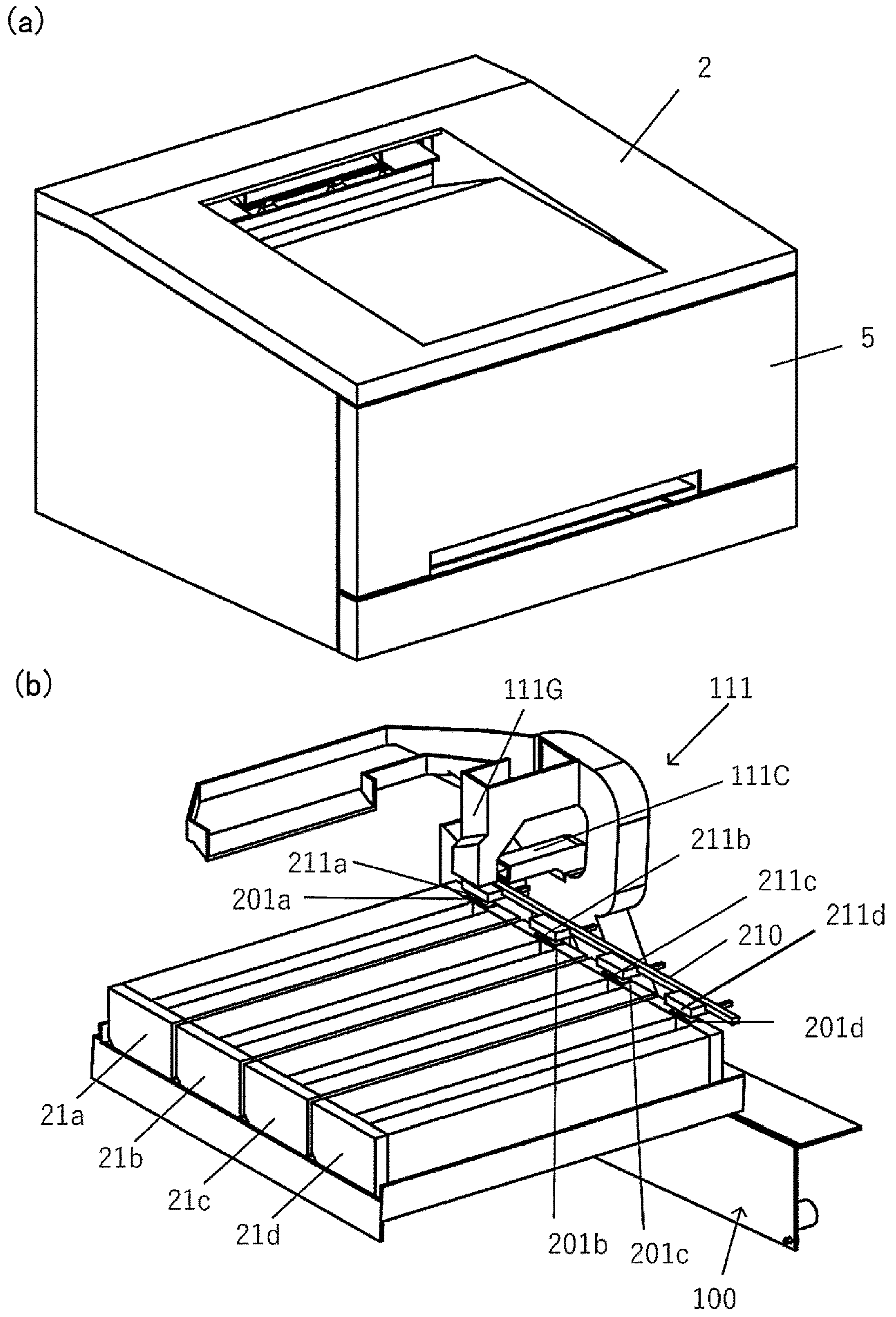
FIG. 12, part (a) and part (b), is a view showing the image forming apparatus according to a second embodiment in a printable state.
Figure 13:
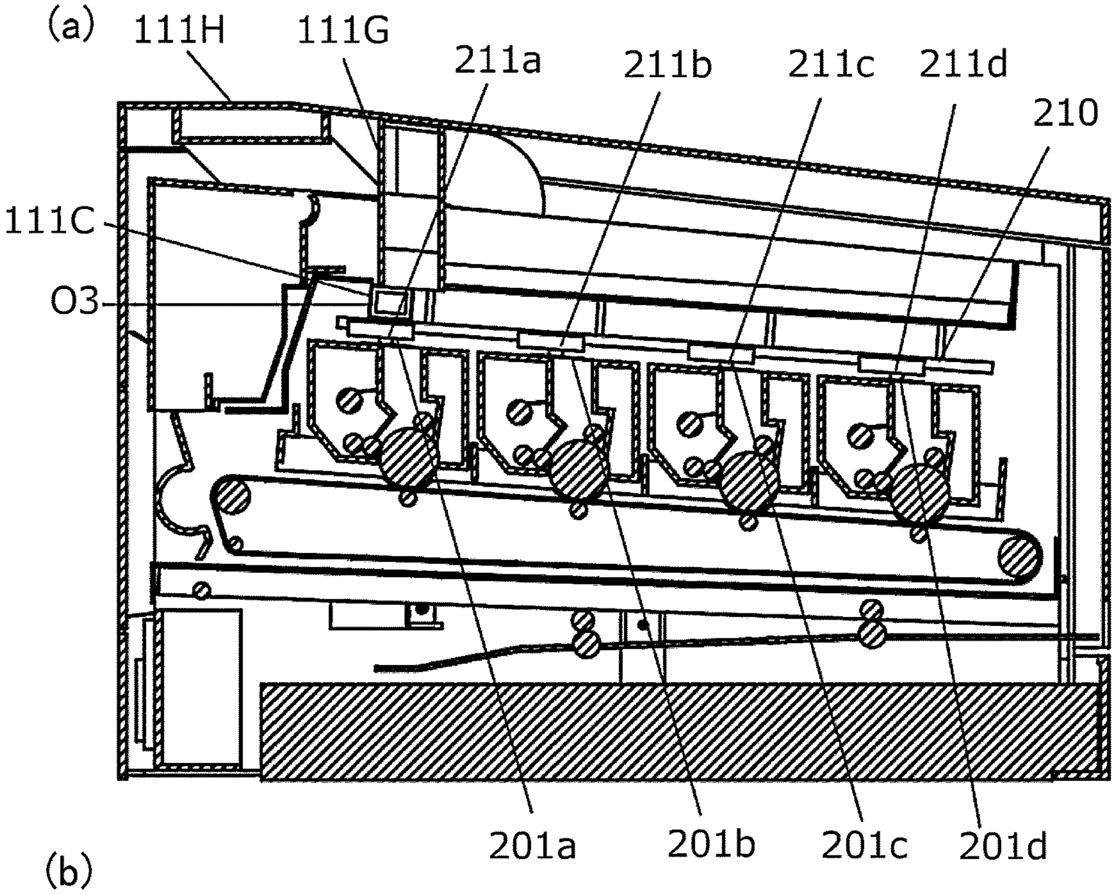
FIG. 13, part (a) and part (b), is a view showing the image forming apparatus according to the second embodiment in the printable state.
Figure 13:
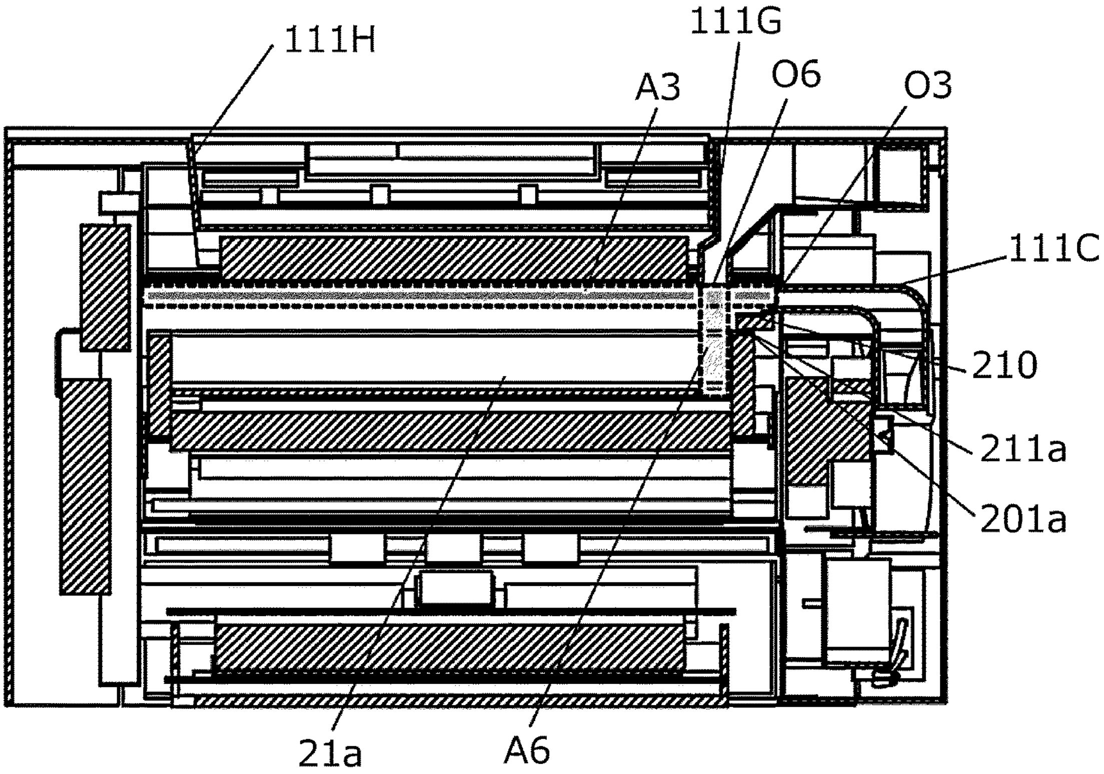

FIGS. 12 and 13 are views showing the image forming apparatus 1 in a printable state. Part (b) of FIG. 12 is a view showing the blower 110 (not shown in part (b) of FIG. 12), the duct 111, the cartridges 21, the power source portion 100 and the communication unit 210. The cartridges 21 include the communication portions 201 (201*a* to 201*d*) which are first communication portions on the upper side of one end in the longitudinal direction. Further, the image forming apparatus 1 includes communication terminals 211 (211*a* to 211*d*) which are a plurality of second communication portions communicable with the communication portions 201. The communication terminals 211, which are part of the communication unit 210 of the main assembly, are brought into contact with the communication portions 201, thereby enabling communication between the cartridges 21 and the main assembly.

(When the Front Door is in a Closed State)

Part (a) of FIG. 13 is a sectional view taken along a CC cross-sectional position in part (b) of FIG. 6. When viewing a cross section perpendicular to the rotational axis direction of the photosensitive drums 24, the communication unit 210 is in a position that does not overlap with the opening portion O3 at the end of the duct 111C which forms the air passage D3, and is configured so as not to obstruct the air F3 from the opening portion O3. Part (b) of FIG. 13 is a sectional view taken along a BB cross-sectional position in part (a) of FIG. 6. In a vertical direction perpendicular to the photosensitive drums 24, the communication unit 210 is in a position that does not overlap with the opening portion O6 at the end of the duct 111G which forms the air passage D6, and it is configured so as not to obstruct the air F6 from the opening portion O6.

(When the Front Door is in an Open State)

Figure 14:
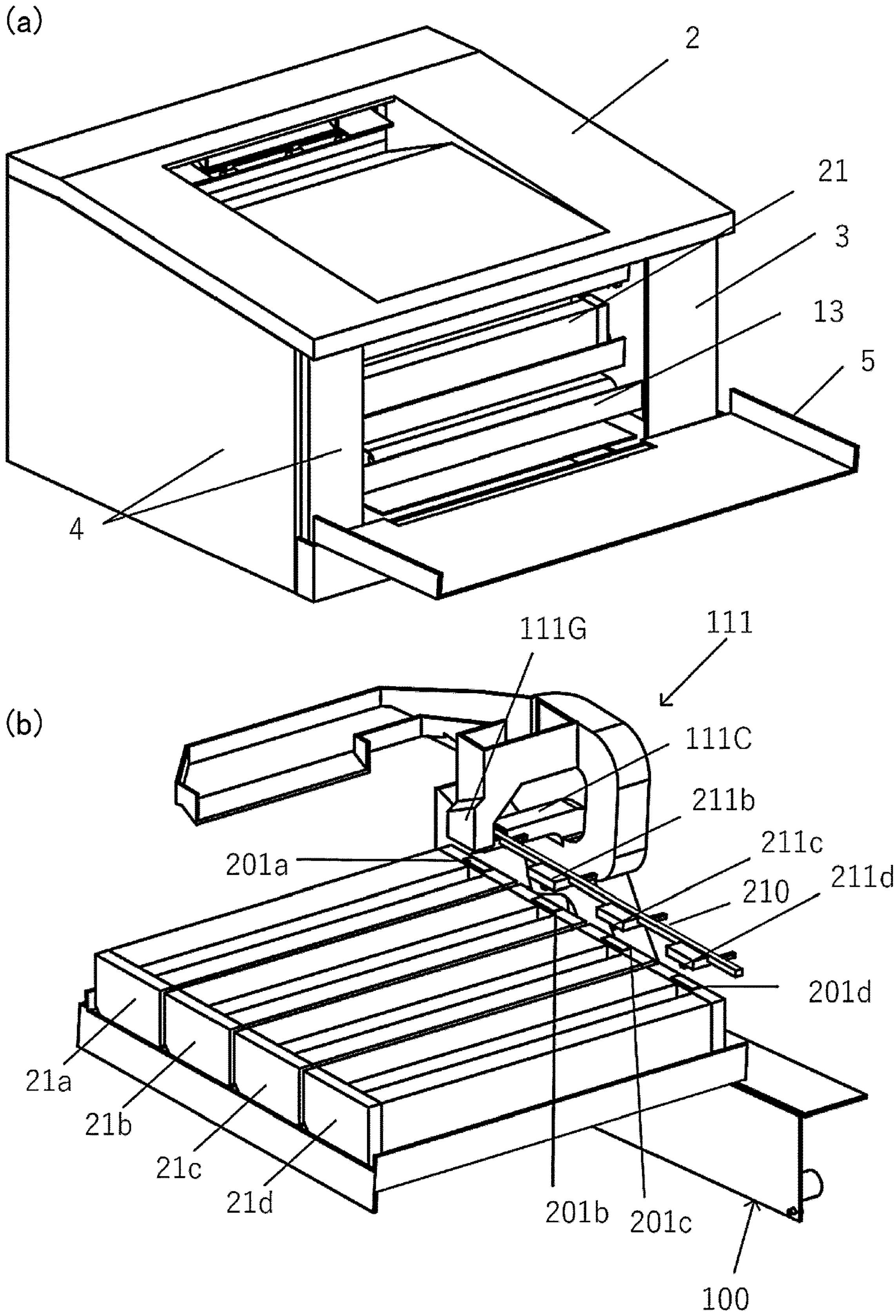
FIG. 14, part (a) and part (b), is a view showing the image forming apparatus according to the second embodiment with a door in an open state.
Figure 15:
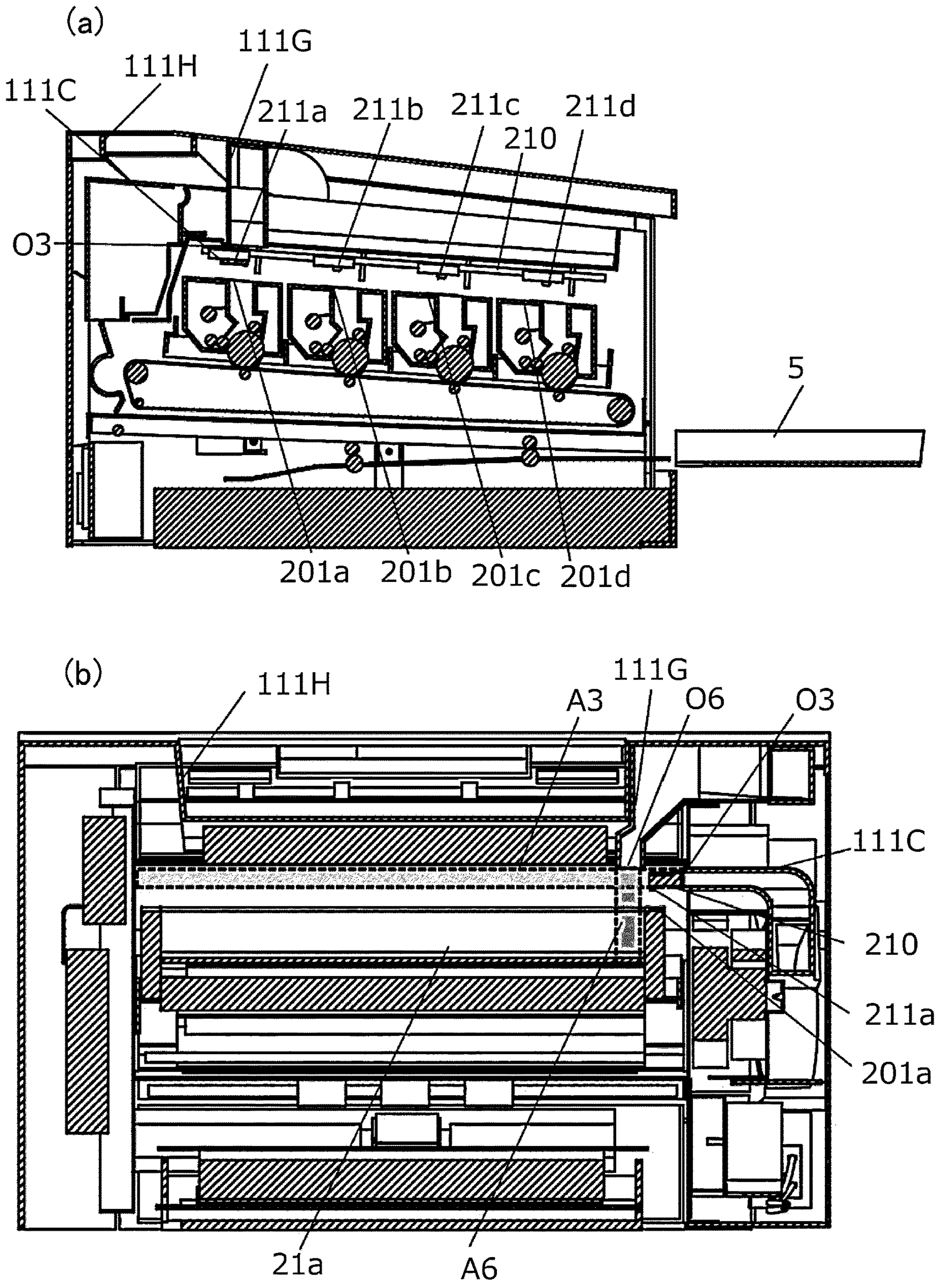
FIG. 15, part (a) and part (b), is a view showing the image forming apparatus according to the second embodiment with the door in the open state.

FIGS. 14 and 15 are views of the image forming apparatus 1 with the front door 5 in the open state. To replace the cartridges 21, a user must open the front door 5. Part (a) of FIG. 14 is a perspective view of an appearance of the image forming apparatus 1. Part (b) of FIG. 14 is a view showing the blower 110 (not shown in part (b) of FIG. 14), the duct 111, the cartridges 21, the power source portion 100 and the communication unit 210. The communication unit 210 is configured to move in a direction away from the cartridges 21 by an interlocking mechanism (not shown) in synchronization with the opening of the front door 5. This is to prevent the communication terminals 211 from being damaged by rubbing against the communication portions 201 when the user opens the front door 5 and then pulls out the cartridges 21. Further, this is to prevent the communication terminals 211 from being damaged by coming into contact with the cartridges 21 when the cartridges 21 are pulled out.

Part (a) of FIG. 15 is a sectional view taken along the CC cross-sectional position in part (b) of FIG. 6. When viewing the cross section perpendicular to the rotational axis direction of the photosensitive drums 24, the opening portion O3 at the end of the duct 111C which forms the air passage D3, and the communication unit 210, specifically the communication terminal 211*a*, are positioned to overlap. Further, part (b) of FIG. 15 is a sectional view taken along the BB cross-sectional position in part (a) of FIG. 6. As described above, the communication unit 210, specifically the communication terminal 211*a*, has moved upward in a direction away from the cartridges 21, for example, upward in the vertical direction, and is now in the region A3. However, the image forming apparatus 1 is controlled so as not to perform printing operations when the front door 5 is in the open state, and the fixing device 70 is not heated or is controlled so as to be at a lower temperature than during printing operations. For this reason, when the front door 5 is in the open state, the cartridges 21 do not necessarily need to be cooled in the same manner as during printing operations. Therefore, when the front door 5 is open, the communication unit 210 may block the opening portion O3. Incidentally, when the front door 5 is open, the communication unit 210 does not need to cover the opening portion O3.

Figure 16:
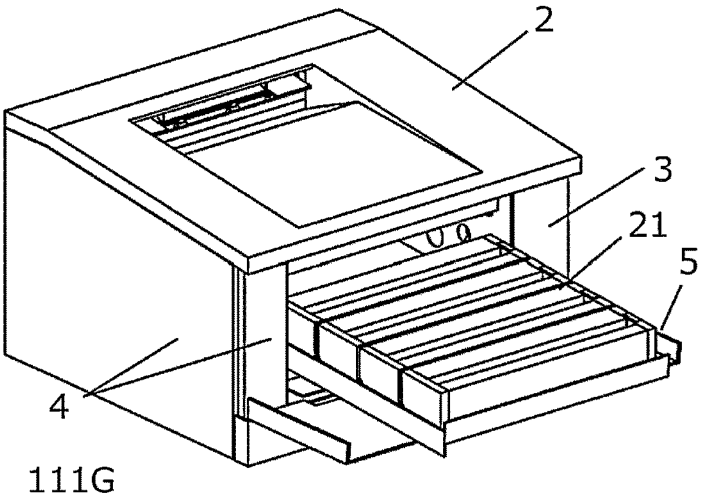
FIG. 16, part (a), part (b) and part (c), is a view showing a state in which a cartridge of the image forming apparatus according to the second embodiment has been pulled out.
Figure 16:
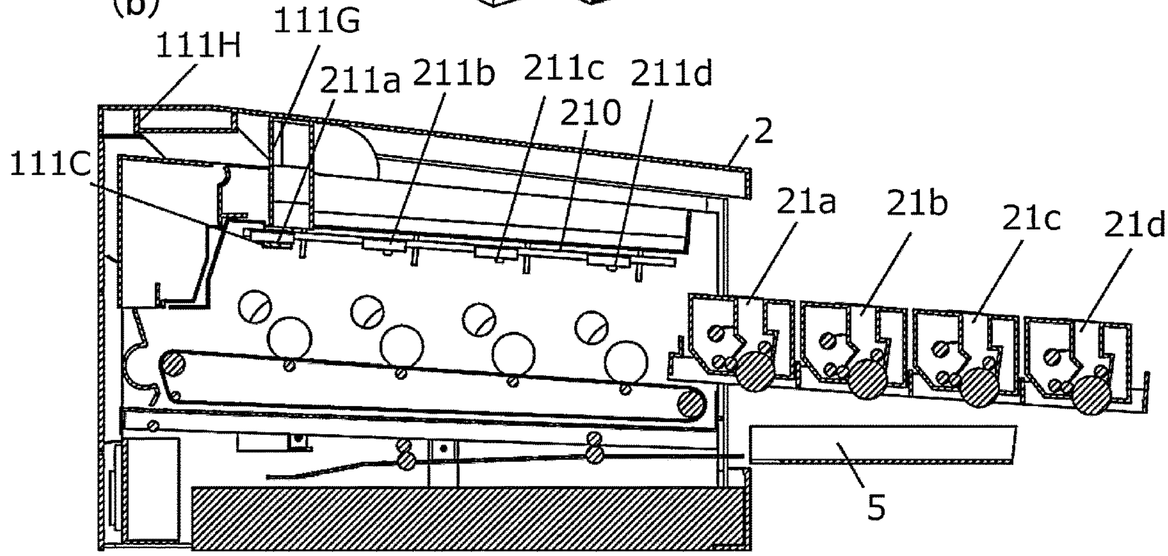
Figure 16:
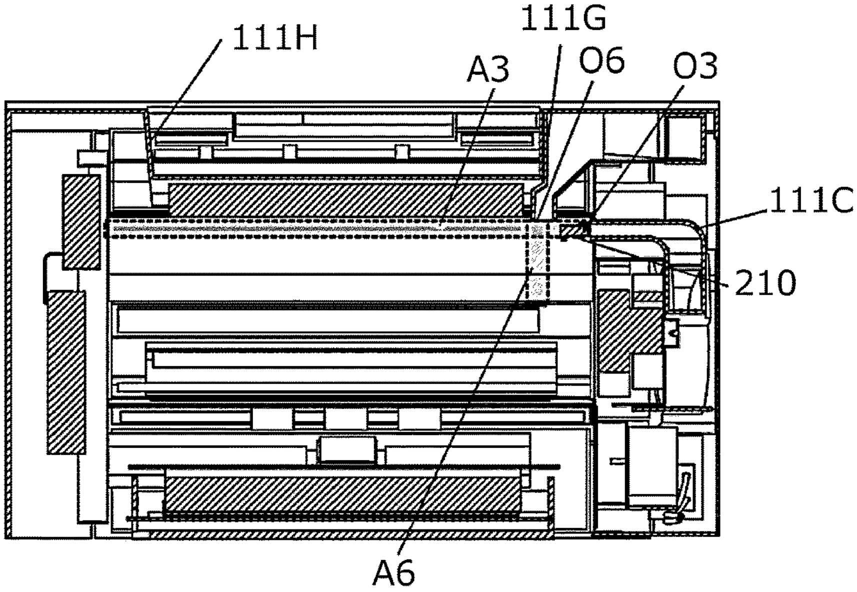

FIG. 16 is a view showing the image forming apparatus 1 when the cartridges 21 are pulled out. The user can pull out the cartridges 21*a* to 21*d* to replace the cartridges 21*a* to 21*d* of the four colors. Part (b) of FIG. 16 is a sectional view taken along the CC cross-sectional position in part (b) of FIG. 6, and part (c) of FIG. 16 is a sectional view taken along the BB cross-sectional position in part (a) of FIG. 6. The state is the same as in FIGS. 14 and 15, except that the cartridges 21 have been pulled out.

Figure 17:
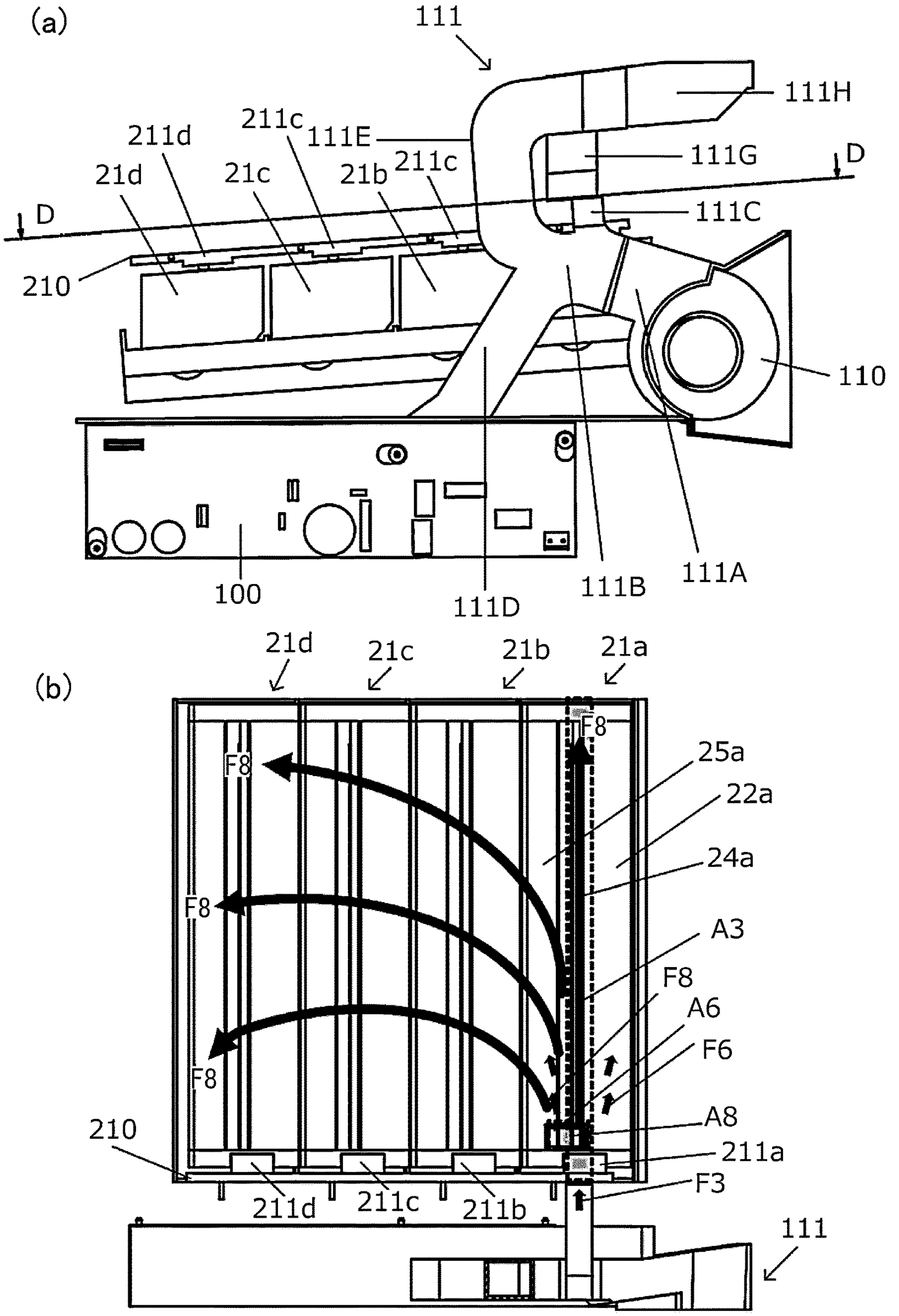
FIG. 17, part (a) and part (b), is a view showing the internal configuration of the image forming apparatus according to the second embodiment, and a view showing the flow of the air F8.

Part (a) of FIG. 17 is a view of the blower 110, the duct 111, the cartridges 21 and the power source portion 100 as viewed from the right side of the image forming apparatus 1. Part (b) of FIG. 17 is a sectional view taken along a DD cross-sectional position in part (a) of FIG. 17. When the cartridges 21 are mounted on the main assembly and the front door 5 is closed, the communication unit 210 is configured to be in a position that does not overlap with either the region A3 which extends from the opening portion O3 or the region A6 which extends from the opening portion O6. As a result, in the second embodiment, it is also possible to generate the air F8 which spreads the air entirely over the cartridges 21*a* to 21*d* as in the first embodiment.

In this way, even if the configuration is such that the image forming apparatus 1 includes the communication unit 210, the direction of the air F8 can be controlled by configuring a large distance to the opening portions O3 and O6, and by crossing the airs F3 and F6 in a position that does not overlap with the communication unit 210. Further, the movable communication unit 210 can be disposed without providing additional space, and the space inside the apparatus can be utilized effectively.

As described above, the image forming apparatus 1 is provided with the front door 5 (door) which allows image formation in the closed state and take-out of the plurality of cartridges 21*a* to 21*d* in the open state. When the front door 5 is at least in the closed state, the communication terminal 211*a* is retracted from a course of the air blown out from the ducts 111C and 111G. As a result, according to the second embodiment, it is possible to reduce the size of the image forming apparatus while efficiently disposing the air passages to cool the plurality of cartridges, thereby reducing costs.

Embodiment 3

Next, a third embodiment will be described. Incidentally, the same components as those described in the first embodiment are designated by the same reference numerals and detailed descriptions thereof will be omitted. The duct 111G in the first embodiment was provided in a direction perpendicular to the rotational axis direction of the photosensitive drums 24, in other words, parallel to the vertical direction. In the third embodiment, the duct 111G and the opening portion O6 in the first embodiment are inclined with respect to the rotational axis direction of the photosensitive drums 24, in other words, they are also inclined with respect to the vertical direction, forming a duct 111G' and an opening portion O6'. In other words, the duct 111G' is inclined so as to go away from one end side in the rotational axis direction of the cartridge 21*a* toward downstream in the flow direction of air F6'.

Further, the duct 111C in the first embodiment was provided to be parallel to the horizontal plane, in other words, parallel to the rotational axis direction of the photosensitive drums 24. In the third embodiment, the duct 111C and the opening portion O3 of the first embodiment are inclined with respect to the rotational axis direction of the photosensitive drums 24, that is, they are arranged so as to intersect with the horizontal plane, forming a duct 111C'. Incidentally, the duct 111C' is inclined so as to be close to the top surface 21U of the cartridges 21 from the upstream to the downstream in the flow direction of air F3'. In other words, the inclination of the duct 111C' is configured so that the air F3' flows from the upper right to the lower left in FIG. 18.

Figure 18:
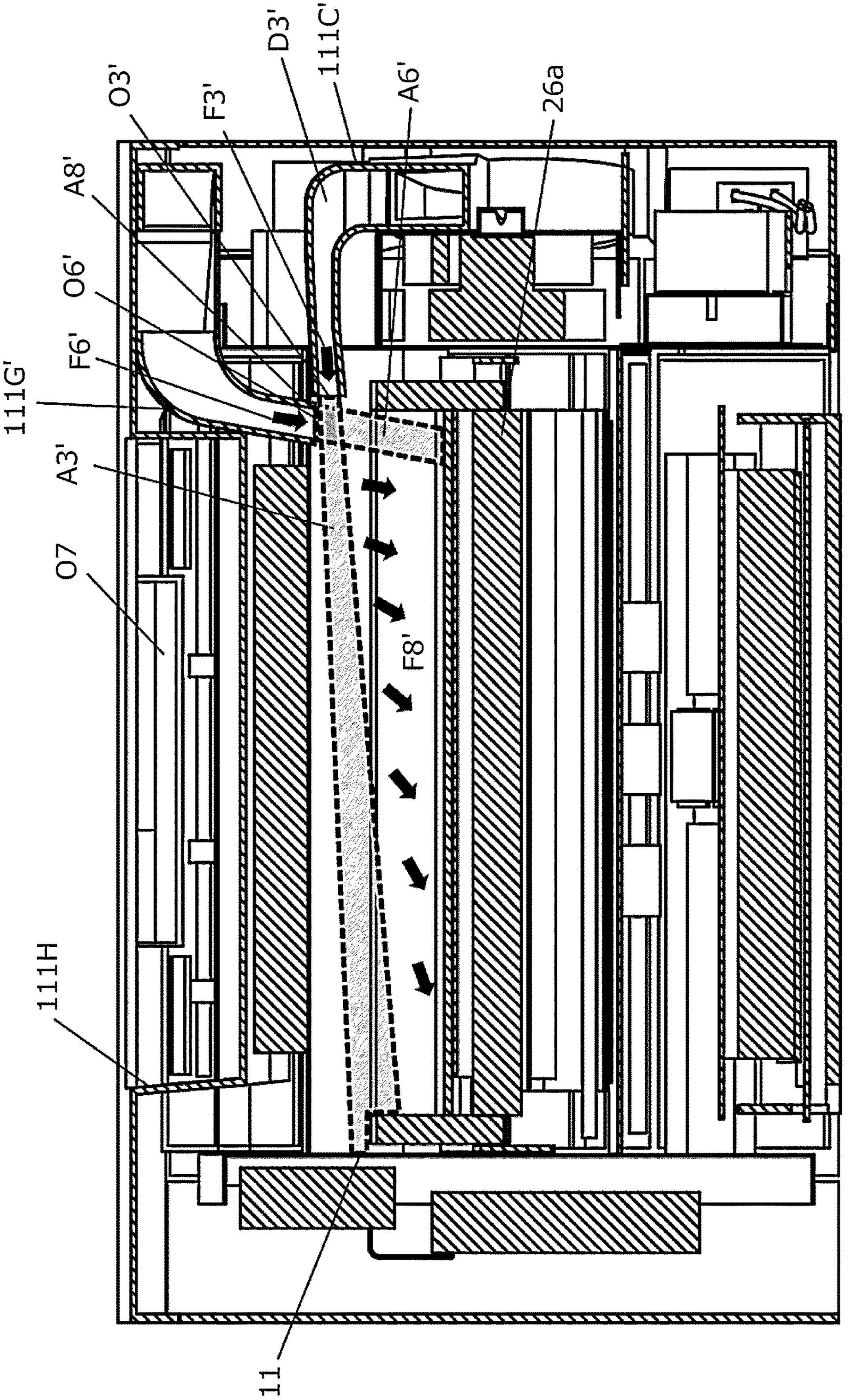
FIG. 18 is a view showing the internal configuration of the image forming apparatus according to a third embodiment.

FIG. 18 is a sectional view of the inside of the apparatus taken along the BB cross section in part (a) of FIG. 6. As in the first embodiment, the region A8' is where a region A3' formed by extending an opening portion O3' and a region A6' formed by extending the opening portion O6' cross each other. The airs F3' and F6' flowing in different directions intersect so as to generate an air F8' having a turbulent component. The airs F3' and F6' flowing in different directions intersect and become turbulent, spreading the air F8' over a wide range, thereby preventing the temperature distribution from becoming uneven when cooling the cartridges 21*a* to 21*d*. Incidentally, the air F8' viewed from the top surface 21U side of the cartridge 21*a* is the same as that shown in FIG. 11.

As described above, according to the third embodiment, it is possible to reduce the size of the image forming apparatus while efficiently disposing the air passages to cool the plurality of cartridges, thereby reducing costs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-103510 on Jun. 23, 2023, which is hereby incorporated by reference herein in its entirety.

What is claimed is:

1. An image forming apparatus for forming an image on a recording material, the image forming apparatus comprising:

a plurality of cartridges each including a developing member for developing an electrostatic latent image formed on a photosensitive member with toner;

a fixing device configured to fix an unfixed toner carried on the recording material;

a fan configured to supply air; and a duct configured to guide the air supplied from the fan to a predetermined cartridge closest to the fixing device of the plurality of cartridges, wherein the predetermined cartridge includes a top surface positioned above in a vertical direction, of two surfaces which the predetermined cartridge includes and which cross in the vertical direction, wherein, at one end side of the predetermined cartridge in a rotational axis direction of the photosensitive member, the duct includes a first part for discharging the air supplied from the fan in a first direction toward downward from upward in the vertical direction to the top surface, and a second part for discharging the air supplied from the fan, above the top surface in the vertical direction, in a second direction along the rotational axis direction of the photosensitive member, and wherein the air discharged from the first part and the air discharged from the second part collide with each other above the top surface.

2. An image forming apparatus according to claim 1, further comprising a first frame crossing in the rotational axis direction and configured to partition the image forming apparatus into an inside and an outside; and a second frame crossing in the rotational axis direction, configured to partition the image forming apparatus into an inside and an outside; and opposite to the first frame, wherein the fan is provided in a side of the outside of the first frame, wherein the first frame includes a third opening or a cutout, and wherein the duct passes through the third opening or the cutout, and bypasses the first frame from above in the vertical direction.

3. An image forming apparatus according to claim 2, further comprising a motor configured to drive the photosensitive member; and a drive frame supported by the first frame and provided with the motor in the side of the outside of the first frame, wherein when the cutout is a first cutout, the drive frame includes a fourth opening or a second cutout which allows the duct to pass.

4. An image forming apparatus according to claim 3, further comprising a cover configured to cover the first frame, wherein the duct is disposed by avoiding the motor in a space formed in a state in which the first frame is covered by the cover.

5. An image forming apparatus according to claim 4, wherein the cover is provided with a back surface portion perpendicular to the first frame and the second frame, wherein the back surface portion includes an opening group including a plurality of openings for taking the air into the fan, wherein the fan is a sirocco fan including a suction opening, and wherein the sirocco fan is disposed such that a surface provided with the suction opening is inclined with respect to a direction where the air is taken into from the opening group.

6. An image forming apparatus according to claim 5, wherein the back surface portion includes a connecting portion to which a cable connected to an AC power source is connected.

7. An image forming apparatus according to claim 3, further comprising a power source portion provided in the outside of the first frame and below the motor in the vertical direction and configured to generate a voltage for driving the motor, wherein the duct discharges the air supplied from the fan in a third direction along the first frame and toward the power source portion.

8. An image forming apparatus according to claim 1, further comprising a discharging portion configured to discharge the recording material on which the toner is fixed by the fixing device, wherein the duct includes a fourth opening through which the air supplied from the fan is discharged in a direction where the recording material is discharged from the discharging portion.

9. An image forming apparatus according to claim 1, wherein the first direction is perpendicular to the top surface, and wherein the second direction is parallel to the top surface.

10. An image forming apparatus according to claim 1, wherein the first direction is inclined so as to go away from the one end side in the rotational axis direction toward downstream in the first direction, wherein the second direction is inclined so as to be close to the top surface toward downstream in the second direction.

11. An image forming apparatus according to claim 1, wherein the plurality of cartridges include a plurality of first communication portions in the top surfaces thereof, respectively, a plurality of second communication portions communicable with the first communication portions, respectively, a door which enables image formation in a closed state thereof and take-out of the cartridges in an open state thereof, wherein when the door is at least in the closed state, the second communication portions are retracted from a course of the air discharged in the first direction and the second direction.

12. An image forming apparatus for forming an image on a recording material, the image forming apparatus comprising:

a plurality of cartridges each including a developing member for developing an electrostatic latent image formed on a photosensitive member with toner;

a fixing device configured to fix an unfixed toner carried on the recording material;

a fan configured to supply air; and a duct configured to guide the air supplied from the fan to a predetermined cartridge closest to the fixing device of the plurality of cartridges, wherein the predetermined cartridge includes a top surface positioned above in a vertical direction, of two surfaces which the predetermined cartridge includes and which cross in the vertical direction, wherein, at one end side of the predetermined cartridge in a rotational axis direction of the photosensitive member, the duct includes a first opening through which the air supplied from the fan is discharged in a first direction toward downward from upward in the vertical direction to the top surface, and a second opening through which the air supplied from the fan, above the top surface in the vertical direction, is blown out in a second direction along the rotational axis direction of the photosensitive member, and wherein an imaginary first region formed by extending the first opening in the first direction and an imaginary second region formed by extending the second opening in the second direction cross with each other above the top surface.

* * * * *